United States Patent

(12) United States Patent
Nitta et al.

(10) Patent No.: US 8,807,014 B2
(45) Date of Patent: Aug. 19, 2014

(54) MULTI-LAYER DIAPHRAGM

(71) Applicant: CKD Corporation, Komaki (JP)

(72) Inventors: Shinichi Nitta, Komaki (JP); Hiroshi Itafuji, Komaki (JP)

(73) Assignee: CKD Corporation, Komaki-shi, Aichi (JP)

( * ) Notice: Subject to any disclaimer, the term of this patent is extended or adjusted under 35 U.S.C. 154(b) by 0 days.

(21) Appl. No.: 14/042,553

(22) Filed: Sep. 30, 2013

(65) Prior Publication Data
US 2014/0030480 A1  Jan. 30, 2014

Related U.S. Application Data

(63) Continuation of application No. PCT/JP2012/059255, filed on Apr. 4, 2012.

(30) Foreign Application Priority Data

Apr. 27, 2011  (JP) ................................. 2011-100012

(51) Int. Cl.
*F04B 43/02* (2006.01)
*B32B 7/12* (2006.01)
*F16K 7/12* (2006.01)
*F16J 3/02* (2006.01)
*F04B 43/04* (2006.01)

(52) U.S. Cl.
CPC .................. *B32B 7/12* (2013.01); *F04B 43/021* (2013.01); *F16K 7/12* (2013.01); *F16J 3/02* (2013.01); *F04B 43/04* (2013.01); *F04B 43/02* (2013.01)
USPC ............ 92/103 M; 92/96; 92/98 R; 92/103 R

(58) Field of Classification Search
CPC ............. F16J 3/02; F01B 19/02; F04B 43/02; F04B 43/025; F04B 43/046; F16K 7/12; B23B 7/12
USPC ............... 92/48, 89, 96, 103 M, 103 R, 98 R; 417/322, 395
See application file for complete search history.

(56) References Cited

U.S. PATENT DOCUMENTS 4,644,847 A * 2/1987 Wolf ................................. 92/78
4,648,807 A * 3/1987 Tippetts et al. ............ 417/413.2
(Continued)

FOREIGN PATENT DOCUMENTS

JP      49-23230     6/1974
JP      53-10058     1/1978
(Continued)

OTHER PUBLICATIONS

Search Report dated Jun. 12, 2012 from International Application No. PCT/JP2012/059255.

*Primary Examiner* — Ned Landrum
*Assistant Examiner* — Logan Kraft
(74) *Attorney, Agent, or Firm* — Beyer Law Group LLP

(57) ABSTRACT

This invention provides a multi-layer diaphragm which is for use in fluid devices and has excellent maintainability in addition to both operability and pressure resistance. This multi-layer diaphragm is provided with a first and second plate and with an elastic adhesive layer which binds together the first and second metal plates. The elastic adhesive layer has an elastic layer that is elastic in a direction which offsets the first and second metal plates from one another in the in-plane direction. The multi-layer diaphragm is provided with a metal mounting plate which, provided in a position allowing protrusion beyond the first and second metal plates in the outer edge direction, has a mounting unit for mounting to the fluid device.

12 Claims, 34 Drawing Sheets

(56) References Cited

U.S. PATENT DOCUMENTS

| | | | |
|---|---|---|---|
| 4,880,213 A | 11/1989 | Shinbori et al. | |
| 6,464,474 B2 * | 10/2002 | Schluecker | 417/383 |
| 2010/0196177 A1 * | 8/2010 | Hirata et al. | 417/413.2 |

FOREIGN PATENT DOCUMENTS

| JP | 61-98980 | 5/1986 |
|---|---|---|
| JP | 62-292965 | 12/1987 |
| JP | 63-173865 | 7/1988 |
| JP | 4-191576 | 7/1992 |
| JP | 6-2663 | 1/1994 |
| JP | 6-506998 | 8/1994 |
| JP | 2006-29314 | 2/2006 |
| JP | 2006-118397 | 5/2006 |
| JP | 2007-515584 | 6/2007 |
| JP | 2007-292011 | 11/2007 |
| JP | 2009-57861 | 3/2009 |
| WO | 92/19866 | 11/1992 |
| WO | 2005/060414 | 7/2005 |
| WO | 2009/051166 | 4/2009 |

* cited by examiner

FIG. 11B
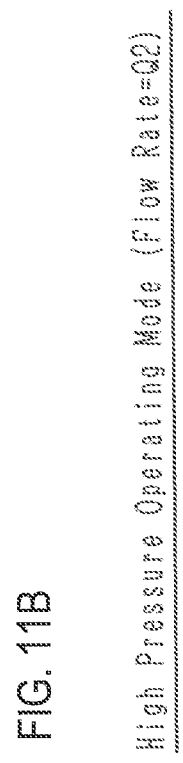
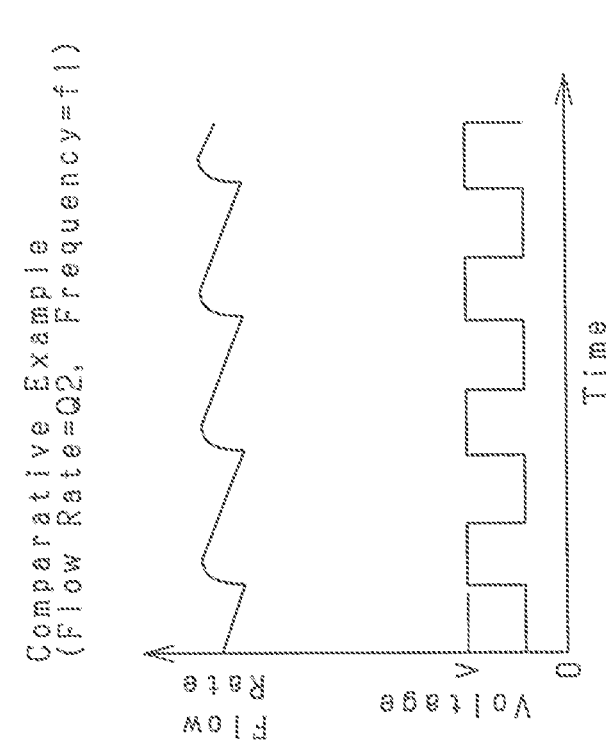
FIG. 11C
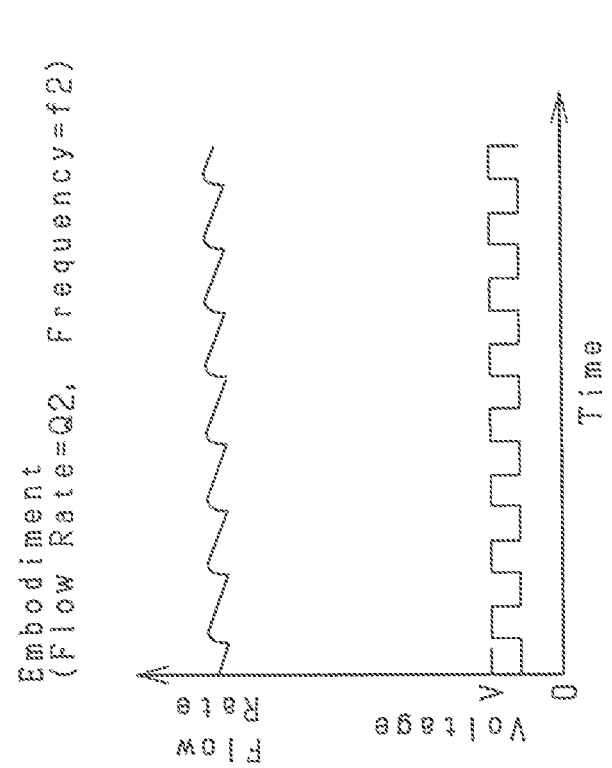

Second Embodiment

First Modified Example

Second Modified Example

MULTI-LAYER DIAPHRAGM

CLAIM OF PRIORITY

This application is a Continuation of International Patent Application No. PCT/JP2012/059255, filed on Apr. 4, 2012, which claims priority to Japanese Patent Application No. 2011-100012, filed on Apr. 27, 2011, each of which is hereby incorporated by reference.

BACKGROUND OF THE INVENTION

1. Field of the Invention

The present invention relates to a device used to control and feed a fluid, and more particularly to a multi-layer diaphragm used in a fluid device (a fluid apparatus) such as a diaphragm pump or a control valve in which a fluid is fed in response to deformation of a diaphragm.

2. Description of the Related Art

Various liquid feed pumps have been proposed for use in high performance liquid chromatography. Examples of proposed methods for driving the liquid feed pump include a plunger method (Japanese Patent Application Publication No. 2007-292011), a piezoelectric method in which a diaphragm is driven by a piezoelectric element (Japanese Patent Application Publication No. 2006-118397), and so on. The piezoelectric method of driving the diaphragm is advantaged in that a sliding part such as that employed in the plunger method is absent, and therefore particle generation does not occur, meaning that a liquid feed pump having a long life can be provided. A multi-layer diaphragm having a fault detection layer for detecting a fault in the diaphragm has been proposed for use with the piezoelectric method of driving the diaphragm (Japanese Translation of PCT Application No. 2007-515584 and Japanese Translation of PCT Application No. H06-506998). Meanwhile, in recent years it has become necessary in high performance liquid chromatography to perform control at a high pressure and a very small flow rate during analysis.

BRIEF DESCRIPTION OF THE INVENTION

However, the present inventor found that when a metallic diaphragm is increased in thickness in order to increase a pressure resistance thereof in response to demand for increased pressure during high performance liquid chromatography, smooth deformation of the diaphragm is impaired, making operations at a very small flow rate difficult. The reason why smooth deformation of the diaphragm is impaired is that a flexural rigidity of the diaphragm increases by a power of three relative to the thickness thereof. In response to this problem, the present inventor proposed a method of laminating thin diaphragm plates in order to realize both pressure resistance and operability during a very small flow rate operation. However, the present inventor ascertained that with this method, dismantling and washing of the diaphragm are complicated, and that characteristics of the diaphragm vary every time the diaphragm is dismantled and so on. The reason for this is that during washing and dismantling, the multiple layers of the diaphragm separate from each other such that when the diaphragm is reattached after being washed, a lamination condition thereof varies. The present inventor also found that this problem is not limited to a liquid feed pump, and is common to apparatuses using diaphragms.

The present invention has been designed to solve at least a part of the problems in the related art, described above, and an object thereof is to provide a multi-layer diaphragm for a fluid device that is easy to maintain and exhibits both operability and pressure resistance.

Effective solutions and so on for solving the problems described above will be described below while illustrating effects and the like where necessary.

First solution is a multi-layer diaphragm to be attached to a fluid device, including: a plurality of metallic plate materials; an adhesion layer adhering the plurality of metallic plate materials to each other. The adhesion layer includes an elastic layer that possesses elasticity in a direction for displacing the plurality of metallic plate materials relative to each other in an in-plane direction thereof.

According to this solution, firstly, the plurality of metallic plate materials are adhered to each other, and therefore an improvement in pressure resistance can be achieved. More specifically, the pressure resistance is dependent on a tensile strength of the metallic plate material in an in-plane direction (a lengthwise direction), and therefore this multi-layer diaphragm exhibits a substantially identical pressure resistance to a metallic plate material formed from a single layer having double the thickness.

Secondly, the plurality of metallic plate materials are adhered to each other by the elastic layer that possesses elasticity in the direction for displacing the plurality of metallic plate materials relative to each other in the in-plane direction thereof, and therefore excessive flexural rigidity can be avoided. Since the plurality of metallic plate materials are adhered to each other by the elastic layer that possesses elasticity in the direction for displacing the plurality of metallic plate materials relative to each other in the in-plane direction thereof, the flexural rigidity of the multi-layer diaphragm is close to that of a plurality of metallic plate materials that are not adhered to each other.

Hence, as regards dismantling and washing of the diaphragm, this multi-layer diaphragm is not dismantled, and therefore an improvement in maintainability can be achieved. Further, the problem of variation in the lamination condition when the diaphragm is reattached after being washed can be solved. Moreover, excessive flexural rigidity occurring when the thickness is increased for the purpose of securing pressure resistance can be avoided in this multi-layer diaphragm, and therefore precision during a very small flow rate operation can be improved.

Second solution is the multi-layer diaphragm according to the first solution, further including a metallic attachment plate material. The attachment plate material includes an attachment portion configured to be attached to the fluid device. The attachment portion is formed in such a manner as to project outward from an outer edge of the plurality of metallic plate materials.

According to the second solution, the attachment plate material includes the attachment portion configured to be attached to the fluid device in such a manner as to project outward from the outer edge of the plurality of metallic plate materials. Therefore, in the metallic plate material not having an attachment portion, the need to consume material to provide an attachment portion can be eliminated, with the result that wasteful material consumption can be avoided.

Third solution is the multi-layer diaphragm according to the second solution, wherein the metallic plate materials are adhered respectively to either side of the attachment plate material.

According to the third solution, the plurality of metallic plate materials are adhered respectively to either side of the attachment plate material, and therefore the part that deforms can be covered by a material that is highly elastic and strong and exhibits superior corrosion resistance, heat resistance, and constant elasticity. Moreover, since the attachment plate material is sandwiched, strengths and such on either side of the attachment plate material can be made approximately equal.

Fourth solution is the multi-layer diaphragm according to the third solution, wherein an equal number of the plurality of metallic plate materials is provided on each side of the attachment plate material.

According to the fourth solution, an equal number of the plurality of metallic plate materials is provided on each side of the attachment plate material, and therefore a symmetrical elastic characteristic can be realized in a lamination direction of the multi-layer diaphragm.

Fifth solution is the multi-layer diaphragm according to any one of the second to fourth solution, wherein the attachment portion includes a positioning portion that regulates a positional relationship between the fluid device and the multi-layer diaphragm.

According to the fifth solution, the attachment portion includes the positioning portion that regulates the positional relationship between the fluid device and the multi-layer diaphragm, and therefore, when the multi-layer diaphragm is reattached, the positional relationship thereof with the fluid device can be reproduced favorably. As a result, a calibration operation performed during reattachment of the multi-layer diaphragm can be simplified. Further, the positioning portion is provided only on the attachment portion of the attachment plate material, and therefore a highly workable material can be used for a part of the plate materials while a highly elastic, strong material exhibiting superior corrosion resistance, heat resistance, and constant elasticity is used for the other plate materials, for example. Thus, design freedom can be provided.

Sixth solution is the multi-layer diaphragm according to the fifth solution, wherein the positioning portion includes a biasing portion that biases a part of the fluid device such that a reaction force is canceled out.

According to the sixth solution, the positioning portion includes the biasing portion that biases a part of the fluid device such that the reaction force is canceled out. Hence, the multi-layer diaphragm can be prevented from falling off the fluid device, making assembly easy.

Seventh solution is the multi-layer diaphragm according to the sixth solution, wherein the fluid device includes a positioning projecting portion, the positioning portion includes a plurality of positioning holes into which the positioning projecting portion is inserted, and the biasing portion is formed as a plurality of elastic projections provided on an inner edge of at least one of the plurality of positioning holes.

According to the seventh solution, the biasing portion is formed as a contour shape provided in at least one of the plurality of positioning holes, and can therefore be manufactured easily by a drilling process alone.

Eighth solution is the multi-layer diaphragm according to the seventh solution, wherein the plurality of positioning holes are formed in positions that are asymmetric when the multi-layer diaphragm is halved in any direction in a plane of the multi-layer diaphragm.

According to the eighth solution, the plurality of positioning holes are formed in positions that are asymmetric when the multi-layer diaphragm is halved in any direction in the plane thereof. As a result, attachment errors occurring when the multi-layer diaphragm is inverted (turned over) or oriented in reverse can be prevented.

Ninth solution is the multi-layer diaphragm according to eighth solution, wherein the plurality of positioning holes are arranged in the attachment portion in an annular shape at an uneven pitch.

According to the ninth solution, the plurality of positioning holes are arranged in an annular shape at an uneven pitch, making it possible to prevent erroneous attachment of the multi-layer diaphragm.

Tenth solution is the multi-layer diaphragm according to any one of the seventh to ninth solution, wherein the fluid device includes a first member and a second member sandwiching the multi-layer diaphragm therebetween, and a fastening member fastening the first member to the second member, the attachment portion includes a plurality of through holes into which the fastening member is inserted, and combinations of the plurality of through holes and the plurality of positioning holes are formed in positions that are asymmetric when the multi-layer diaphragm is halved in any direction in the plane of the multi-layer diaphragm.

According to the tenth solution, the combinations of the plurality of through holes and the plurality of positioning holes are formed in positions that are asymmetric when the multi-layer diaphragm is halved in any direction in the plane thereof, and therefore attachment errors occurring when the multi-layer diaphragm is inverted (turned over) or oriented in reverse can be prevented.

Eleventh solution is the multi-layer diaphragm according to any one of the seventh to tenth solution, wherein the fluid device includes a first member and a second member sandwiching the multi-layer diaphragm therebetween, and a fastening member fastening the first member to the second member, the attachment portion includes a plurality of through holes into which the fastening member is inserted, and the plurality of through holes are formed in positions that are asymmetric when the multi-layer diaphragm is halved in any direction in the plane of the multi-layer diaphragm.

As illustrated by the eleventh solution, attachment errors occurring when the multi-layer diaphragm is inverted (turned over) or oriented in reverse can be prevented simply by the plurality of through holes into which the fastening member is inserted.

Twelfth solution is the multi-layer diaphragm according to the eleventh solution, wherein the plurality of through holes are arranged in the attachment portion in an annular shape at an uneven pitch.

According to the twelfth solution, the plurality of through holes are arranged in an annular shape at an uneven pitch, making it possible to prevent erroneous attachment of the multi-layer diaphragm.

Thirteenth solution is the multi-layer diaphragm according to any one of the first to twelfth solution, wherein the fluid device is a liquid feed pump.

BRIEF DESCRIPTION OF THE DRAWINGS

FIGS. 11A, 11B, and 11C are graphs showing the content of driving frequency switching performed on the diaphragm of the liquid feed pump 100.

DETAILED DESCRIPTION OF EMBODIMENTS OF THE INVENTION

Specific embodiments of the present invention will be described below with reference to the drawings. The embodiments relate to a liquid feed pump used in high pressure gas chromatography.

First Embodiment

Figure 1:
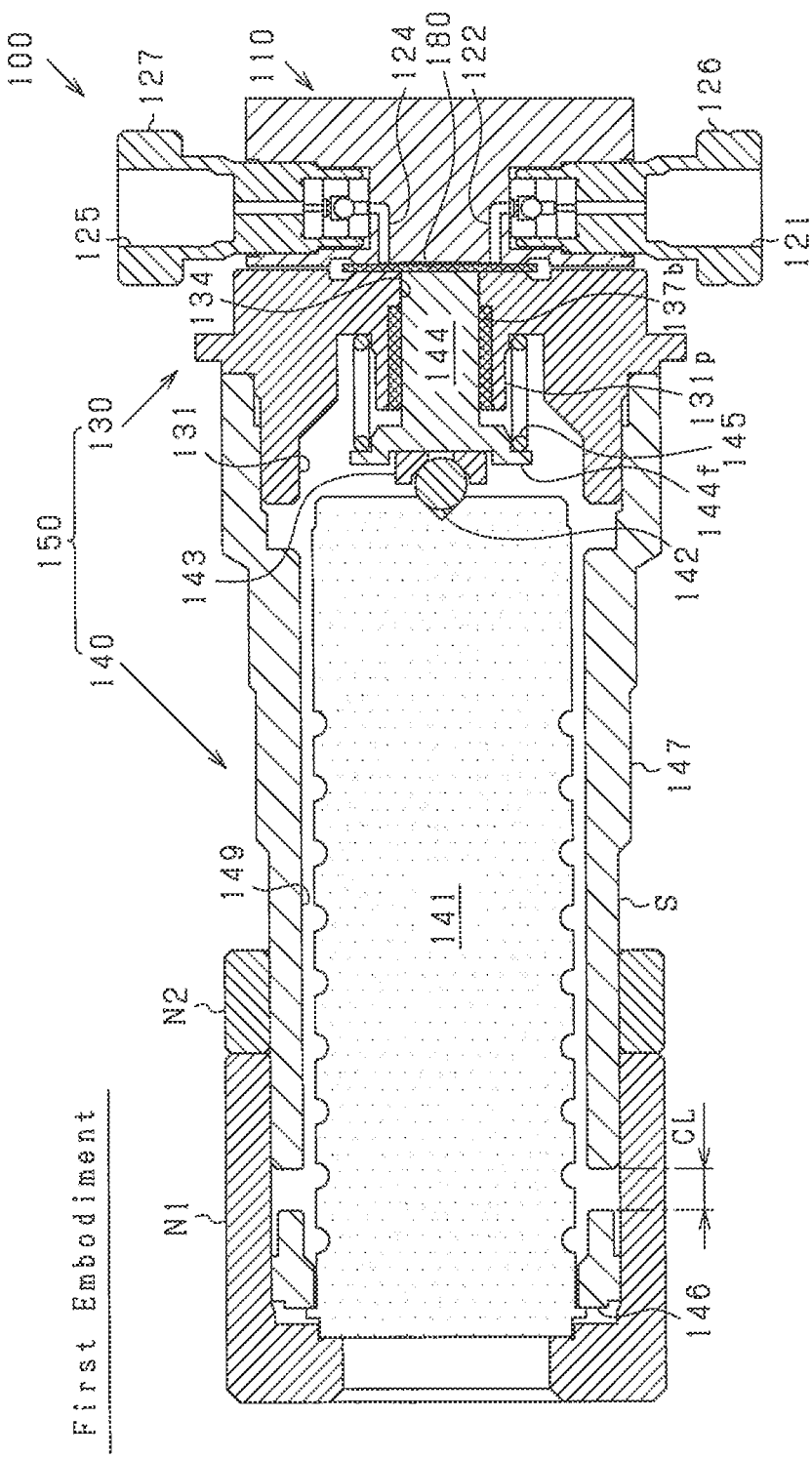
FIG. 1 is a sectional view of a liquid feed pump 100 according to a first embodiment.
Figure 2:
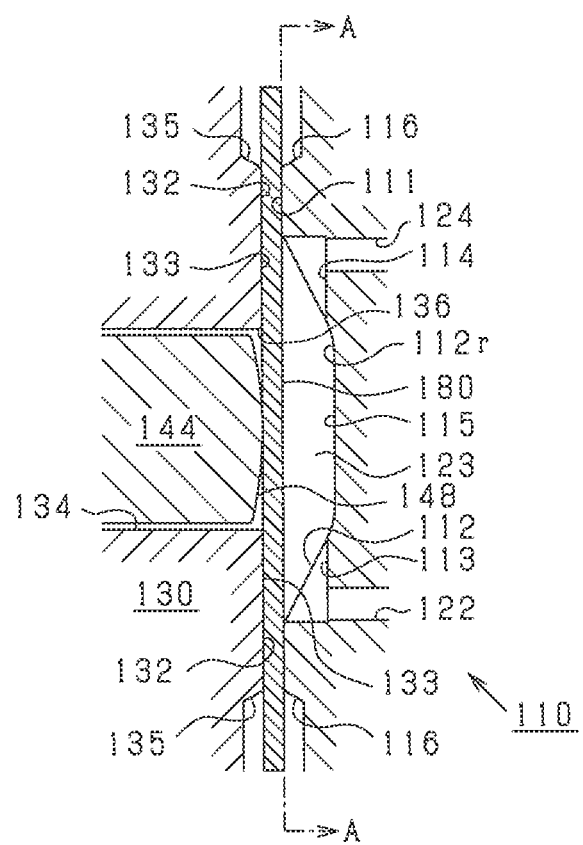
FIG. 2 is an enlarged sectional view showing a diaphragm 180 of the liquid feed pump 100.
Figure 3:
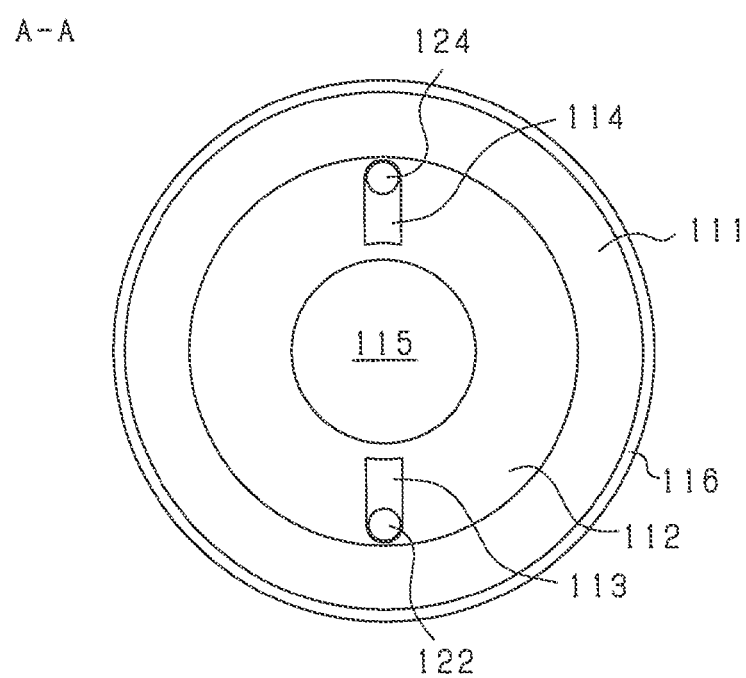
FIG. 3 is a view showing an inner surface of a pump chamber 123 of the liquid feed pump 100.

FIG. 1 is a sectional view of a liquid feed pump 100 according to a first embodiment. FIG. 2 is an enlarged sectional view showing a diaphragm 180 of the liquid feed pump 100. FIG. 3 is a view showing an inner wall surface of a pump chamber 123 of the liquid feed pump 100. The liquid feed pump 100 is used to pump an eluent during high performance liquid chromatography. In high performance liquid chromatography, the eluent (methanol, for example) is led to a column (to be described below) after being pressurized. Therefore, with high performance liquid chromatography, in comparison with column chromatography (also known as medium/low pressure chromatography) where the eluent is caused to flow to the column by gravity, a time during which a sample serving as an analysis subject remains in a solid phase can be shortened, and improvements in resolution and detection sensitivity can be achieved.

The liquid feed pump 100 is a diaphragm pump including a pump body 110, check valves 126 and 127, a metallic diaphragm 180, and an actuator 150 that drives the diaphragm 180. An inlet side internal flow passage 122, an outlet side internal flow passage 124, and the check valves 126 and 127 are formed in the pump body 110 as a flow passage through which the eluent flows. The pump body 110 can be manufactured using a metal or a PEEK material, for example.

The check valve 126 allows the eluent to flow only from an inflow port 121 (an IN port) in the direction to the inlet side internal flow passage 122, and prohibits the eluent from flowing in an opposite direction. The check valve 127, meanwhile, allows the eluent to flow only from the outlet side internal flow passage 124 in the direction to a discharge port 125 (an OUT port), and prohibits the eluent from flowing in an opposite direction.

Note that in FIG. 1, a fastening tool for fastening the pump body 110 to a pump base 130 is not shown.

The pump body 110 has a columnar shape including a truncated cone-shaped recessed portion surface in a central position on one end surface. As shown in FIGS. 2 and 3, the pump chamber 123 is formed as a space surrounded by the truncated cone-shaped recessed portion surface and the diaphragm 180. The truncated cone-shaped recessed portion surface includes a flat end portion 115 which is a circular flat surface formed in a central position, a conical inclined surface 112 formed on a periphery of the flat end portion 115, and a donut-shaped curved surface 112r formed between the flat end portion 115 and the inclined surface 112. In this embodiment, the truncated cone-shaped recessed portion surface is formed as a recessed curved surface having a recessed curved surface shape that fits into the diaphragm when the diaphragm is driven in a discharge direction.

Opening portions of the inlet side internal flow passage 122 and the outlet side internal flow passage 124 are formed in an outer edge portion of the inclined surface 112 of the recessed portion. The opening portions are disposed in mutually opposing positions on either side of the flat end portion 115. More specifically, the inlet side internal flow passage 122 and the outlet side internal flow passage 124 are disposed in a vertical relationship on either side of a center of the flat end portion 115. An intake side groove portion 113 extending upward in FIG. 3 toward the central position of the truncated cone-shaped recessed portion surface is formed as a continuation of the opening portion of the inlet side internal flow passage 122. A discharge side groove portion 114 extending downward in FIG. 3 toward the central position of the truncated cone-shaped recessed portion surface is formed as a continuation of the opening portion of the outlet side internal flow passage 124.

With this configuration, communication between the inlet side internal flow passage 122 and the outlet side internal flow passage 124 can be secured sufficiently in the pump chamber 123 even when the diaphragm 180 displaces so as to approach the inclined surface 112. Note that the inlet side internal flow passage 122 and the outlet side internal flow passage 124 will also be referred to respectively as an intake passage and a discharge passage.

The pump base 130 takes a donut shape in which a cylinder hole 134 as a columnar hole is formed in a central axis position. Truncated cone-shaped projecting portion surfaces 132, 133 and 135 and an opening portion 136 of the cylinder hole 134 are formed in one end surface of the pump base 130, and a truncated cone-shaped recessed portion surface 131 is formed in another surface. As shown in FIG. 1, an annular projecting portion 131p for forming the cylinder hole 134 is provided on an end portion of the recessed portion surface 131. A slide bearing 137b inserted from the annular projecting portion 131p side is attached to the cylinder hole 134. The truncated cone-shaped projecting portion surfaces 132, 133 and 135 include integrated annular flat surfaces 132 and 133 surrounded on a periphery thereof by an inclined surface 135. The opening portion 136 of the cylinder hole 134 is formed concentrically with the annular flat surfaces 132 and 133 (a diaphragm receiving surface 133, to be described below). In other words, the opening portion 136 is disposed in a central position of the annular flat surfaces 132 and 133. Further, a center of the opening portion 136 of the cylinder hole 134 is aligned with a center of the aforesaid recessed portion surface in an axial direction of the cylinder hole 134 (a left side in FIG. 2).

The diaphragm 180 is sandwiched between the pump body 110 and the pump base 130. A seal pressurization surface 111 constituted by an annular flat surface is formed on a periphery of the inclined surface 112 of the pump body 110. An inclined surface 116 is formed on an outer periphery of an outer edge of the seal pressurization surface 111, and the seal pressurization surface 111 is formed as an annular projecting portion. The annular flat surfaces 132 and 133 of the pump base 130, meanwhile, form an integrated flat surface having two regions, namely a seal receiving surface 132, which is parallel to the seal pressurization surface 111, and the diaphragm receiving surface 133, which opposes the inclined surface 112. By sandwiching the diaphragm 180 between the seal pressurization surface 111 and the seal receiving surface 132, the pump chamber 123 is sealed from the outside.

Note that the seal pressurization surface 111 and seal receiving surface 132 will also be referred to as a seal portion. Further, a role of the diaphragm receiving surface 133 will be described below.

Hence, the pump chamber 123 is configured as a sealed space that can be varied in volume by displacing the diaphragm 180. With this configuration, the liquid feed pump 100 can function as a pump that performs intake from the check valve 126 and discharge from the check valve 127 by periodically varying the volume of the pump chamber 123. Note that the pump base 130 and pump body 110 will also be referred to as a pump housing.

The volume of the pump chamber 123 can be varied by driving the diaphragm 180 to deform using the actuator 150. The actuator 150 includes a driving member 140 having a piston 144 that drives the diaphragm 180, and the pump base 130. Note that the piston 144 will also be referred to as a reciprocating member.

The driving member 140 includes the piston 144, the slide bearing 137b, a biasing spring 145, a laminated piezoelectric actuator 141, an actuator housing 147, an adjuster 143, a steel ball 142, a piezoelectric actuator attachment portion 146, and a double nut N1 and N2. The piston 144 is a columnar member having a flange 144f that extends in a radial direction on one end portion (a left side end portion in FIG. 1) and a projecting end surface 148 (see FIG. 2) on another end portion (a right side end portion in FIG. 1). The piston 144 is supported by the slide bearing 137b in an interior of the columnar cylinder hole 134 to be capable of reciprocating in an axial direction of the cylinder hole 134.

Driving force is applied to the piston 144 from the laminated piezoelectric actuator 141 via the steel ball 142 and the adjuster 143. The steel ball 142 is sandwiched to be capable of sliding between a recessed portion formed in a central position of the adjuster 143, which is attached to a central portion of the flange 144f, and a recessed portion formed in a central position of the laminated piezoelectric actuator 141. As a result, eccentric errors and tilting between the laminated piezoelectric actuator 141 and the piston 144 can be absorbed. The biasing spring 145 biases the piston 144 in a direction for reducing driving force applied to the diaphragm 180 in the flange 144f.

The laminated piezoelectric actuator 141 is stored in a columnar inner hole 149 formed in an interior of the actuator housing 147, and attached to the actuator housing 147 by a position adjustment nut N1 and a fixing nut N2 via the piezoelectric actuator attachment portion 146. By adjusting an amount (a length) by which a male screw S formed on an outer periphery of the actuator housing 147 is screwed to a female screw formed on an inner periphery of the position adjustment nut N1, a relative positional relationship between the laminated piezoelectric actuator 141 and the pump base 130 in a driving direction of the piston 144 can be adjusted.

This adjustment can be absorbed by a clearance CL between the actuator housing 147 and the piezoelectric actuator attachment portion 146. The fixing nut N2 functions as a double nut together with the position adjustment nut N1 so that the position of the piezoelectric actuator attachment portion 146 can be fixed following adjustment of the positional relationship.

Figure 4:
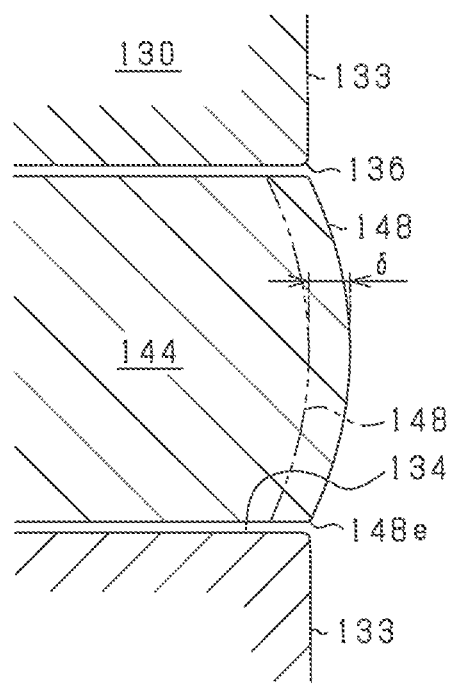
FIG. 4 is an enlarged sectional view showing a positional relationship between a piston 144 and an opening portion 136.

FIG. 4 is an enlarged sectional view showing a positional relationship between the piston 144 and the opening portion 136. In FIG. 4, a position of the piston 144 when not driven is indicated by a dashed-two dotted line, and a position of the piston 144 when driven in a high pressure mode is indicated by a solid line. When the piston 144 is not driven, the position of the laminated piezoelectric actuator 141 is adjusted such that an apex of the end surface 148 of the piston 144 is in a substantially identical position to the opening portion 136 in a displacement direction of the piston 144. When the piston 144 is driven, on the other hand, a driving voltage of the laminated piezoelectric actuator 141 is adjusted such that the piston 144 displaces in the displacement direction by a displacement amount $\delta$, as a result of which a peripheral edge portion 148e of the end surface 148 of the piston 144 reaches an identical position to the opening portion 136.

Figure 5A:
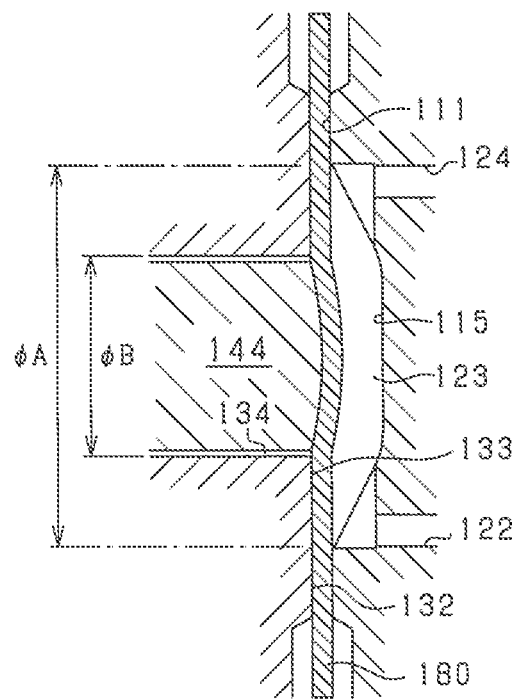
FIGS. 5A and 5B are sectional views showing operating conditions of the liquid feed pump 100 according to the first embodiment.
Figure 5B:
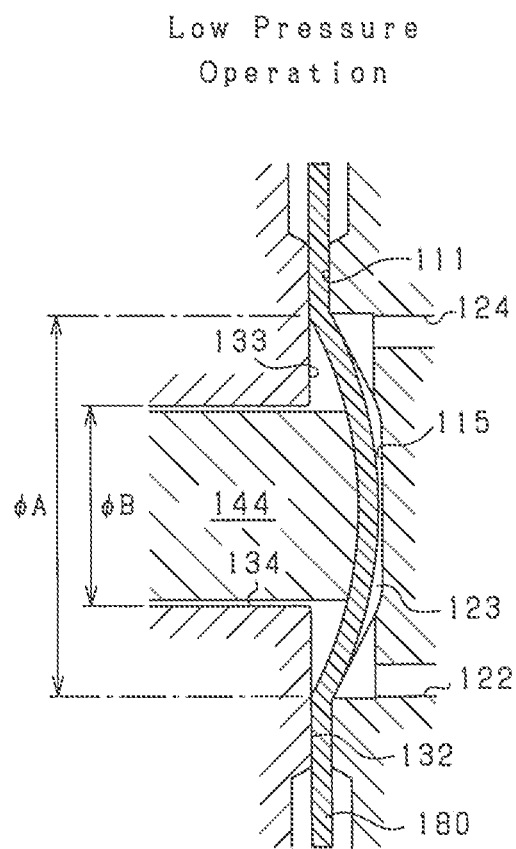

FIGS. 5A and 5B are sectional views showing operating conditions of the liquid feed pump 100 according to the first embodiment. FIG. 5A shows a driving condition during a high pressure operation, and FIG. 5B shows a driving condition during a low pressure operation. The high pressure operation is an operating condition in which the eluent is fed during measurement. The low pressure operation is an operating condition in which a liquid is fed in order to clean pipes while measurement is not underway.

During the high pressure operation, the diaphragm 180 is supported by the diaphragm receiving surface 133 and the piston 144. In other words, the diaphragm 180 is capable of transferring a load received from the high-pressure eluent in the pump chamber 123 to the diaphragm receiving surface 133 and the piston 144. More specifically, a circular range having a diameter φB in a central position of the diaphragm 180 is supported by the piston 144, while an annular range obtained by excluding the circular range having the diameter φB from a circular range having a diameter φA is supported by the diaphragm receiving surface 133.

Hence, during the high pressure operation, a deformation range (an operating range) of the diaphragm 180 can be limited to the circular range having the diameter φB, and therefore the diaphragm 180 functions as a small diaphragm substantially including the circular range having the diameter φB. When the diaphragm is small, the diaphragm 180 can be driven appropriately by the laminated piezoelectric actuator 141 against the load applied to the diaphragm 180 even when the pressure of the eluent is high.

Further, deformation of the diaphragm 180 under high pressure is limited to the vicinity of the opening portion 136 into which the piston 144 is inserted, and therefore variation in the volume of the pump chamber 123 accompanying displacement of the piston 144 is reduced. As a result, an amount by which the piston 144 displaces in response to variation in the volume of the pump chamber 123 can be increased, making it clear that the operating condition of the diaphragm 180 corresponds to a deformed condition suitable for control at a high-pressure, very small flow rate.

During the low pressure operation, on the other hand, the diaphragm 180 is supported by the piston 144 alone. During the low pressure operation, the diaphragm 180 separates from the diaphragm receiving surface 133 to be capable of deforming greatly in the interior of the pump chamber 123, and therefore the diaphragm 180 functions as a large diaphragm substantially including the circular range having the diameter φA. When the diaphragm is large, the eluent can be supplied in a large discharge amount by the laminated piezoelectric actuator 141, and therefore the pipes or the like can be cleaned smoothly.

Figure 6A:
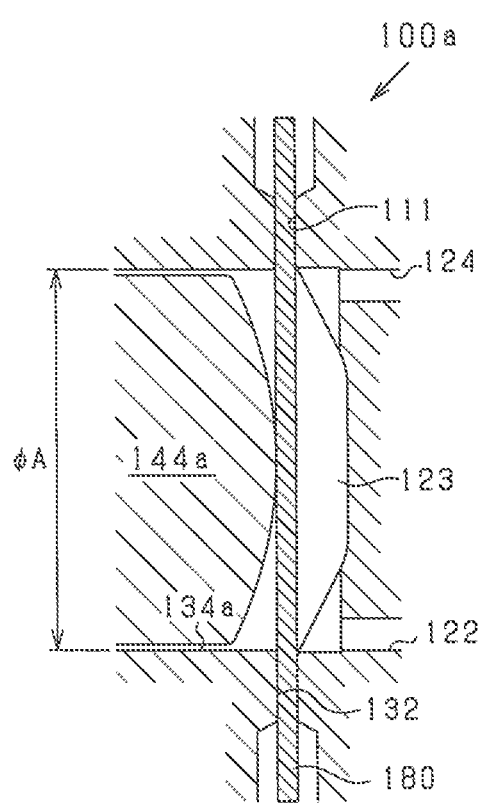
FIGS. 6A, 6B, and 6C are sectional views showing operating conditions of a liquid feed pump 100a according to a first comparative example.
Figure 6B:
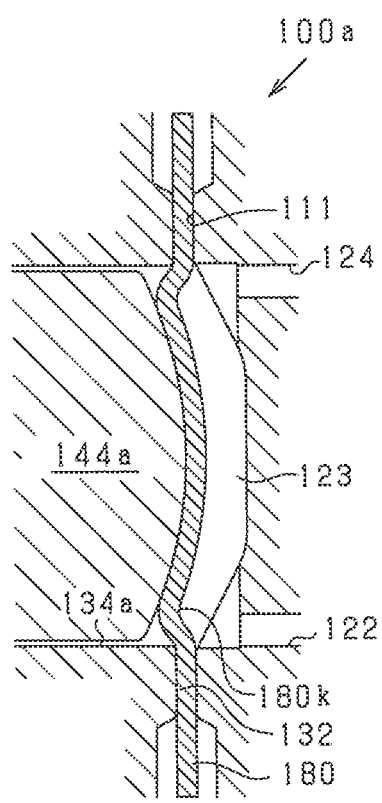
Figure 6C:
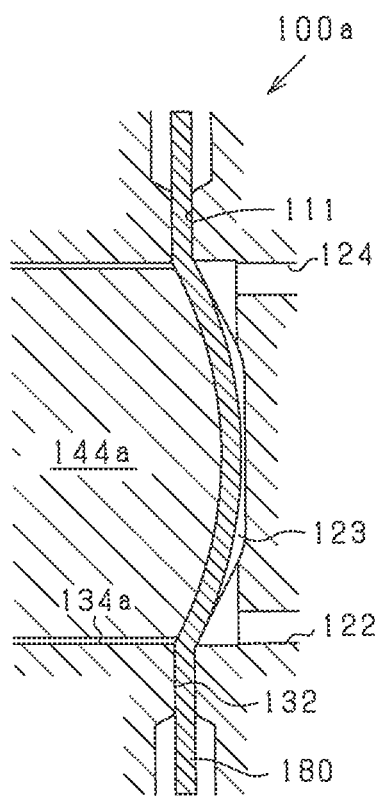

FIGS. 6A, 6B, and 6C are sectional views showing operating conditions of a liquid feed pump 100a according to a first comparative example. FIG. 6A shows a condition in which the liquid feed pump 100a according to the first comparative example is not driven. FIG. 6B shows a condition in which the liquid feed pump 100a according to the first comparative example is operated at a high pressure. FIG. 6C shows a condition in which the liquid feed pump 100a according to the first comparative example is operated at a low pressure. The first comparative example is a comparative example for clarifying an effect of the diaphragm receiving surface 133.

The liquid feed pump 100a according to the first comparative example differs from the liquid feed pump 100 according to the first embodiment in that the diaphragm receiving surface 133 is not provided, and a diameter of the cylinder hole 134 is enlarged to a region of the diaphragm receiving surface 133 such that a cylinder hole 134a is formed. Since the liquid feed pump 100a according to the first comparative example does not include the diaphragm receiving surface 133 of the first embodiment, the diaphragm 180 functions as a large diaphragm during the low pressure operation.

More specifically, as shown in FIG. 6C, the liquid feed pump 100a according to the first comparative example is capable of functioning as a diaphragm pump capable of discharging a comparatively large discharge amount at a low pressure, similarly to the first embodiment. However, the present inventors found that at a high pressure, as shown in FIG. 6B, the diaphragm 180 is pressed against a piston 144a such that a bend 180k occurs as a deformation in a direction for reducing an amount by which the volume of the pump chamber 123 is reduced (a partial deformation that increases the volume of the pump chamber 123), and as a result, discharge cannot be performed efficiently. Further, the bend 180k is excessive and therefore causes damage. Moreover, at a high pressure, a load exerted on the piston 144a from the diaphragm 180 is larger than in the first embodiment, and therefore an excessive load is exerted on the laminated piezoelectric actuator 141.

Hence, during the high pressure operation, the diaphragm receiving surface 133 serves to suppress formation of the unnecessary bend 180k in the diaphragm 180 and prevent an excessive load from being exerted on the laminated piezoelectric actuator 141.

Figure 7A:
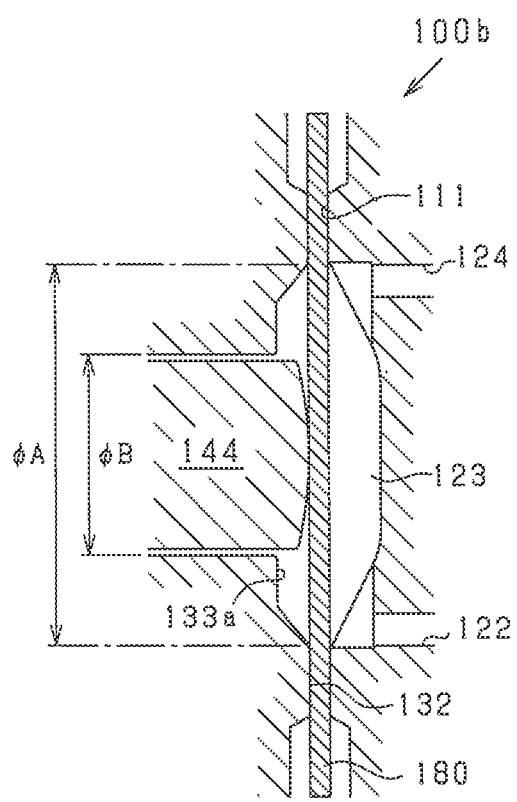
FIGS. 7A, 7B and 7C are sectional views showing operating conditions of a liquid feed pump 100b according to a second comparative example.
Figure 7B:
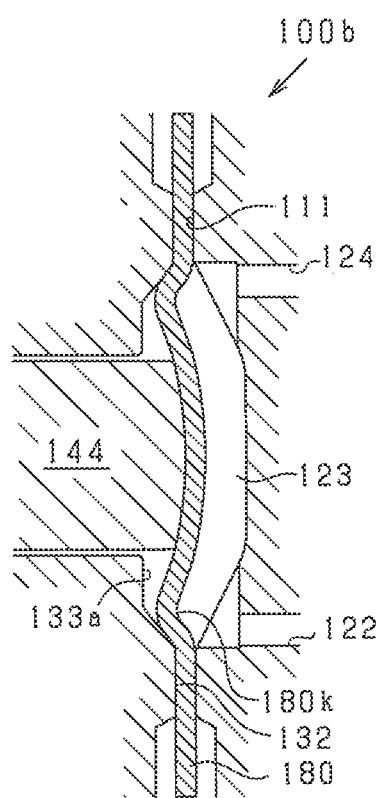
Figure 7C:
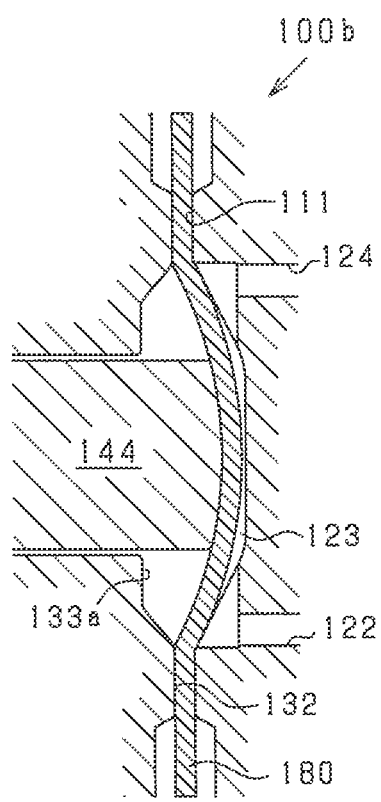

FIGS. 7A, 7B and 7C are sectional views showing operating conditions of a liquid feed pump 100b according to a second comparative example. FIG. 7A shows a condition in which the liquid feed pump 100b according to the second comparative example is not driven. FIG. 7B shows a condition in which the liquid feed pump 100b according to the second comparative example is operated at a high pressure. FIG. 7C shows a condition in which the liquid feed pump 100b according to the second comparative example is operated at a low pressure. The second comparative example is a comparative example for clarifying a purpose of providing the diaphragm receiving surface 133 according to the first embodiment to be coplanar with (or on a nearby plane to) the seal receiving surface 132.

The liquid feed pump 100b according to the second comparative example differs from the liquid feed pump 100 according to the first embodiment in that the diaphragm receiving surface 133 is constituted by a diaphragm receiving surface 133a positioned in a direction (a left side direction in the drawing) separating from the pump chamber 123. The diameter of the piston 144, meanwhile, is identical to that of the liquid feed pump 100 according to the first embodiment.

At a low pressure, as shown in FIG. 7C, the liquid feed pump 100b can operate as a diaphragm pump that discharges a comparatively large discharge amount at a low pressure, similarly to the first embodiment and the first comparative example. At a high pressure, however, as shown in FIG. 7B, a load is received from the high-pressure eluent over an entire surface of the diaphragm 180, similarly to the first comparative example, and therefore the diaphragm 180 is pressed into the periphery of the piston 144 such that the unnecessary bend 180k is formed, thereby impairing discharge and causing wear. Furthermore, similarly to the first comparative example, an excessive load is exerted on the laminated piezoelectric actuator 141 at a high pressure.

Hence, a striking effect is obtained by forming the diaphragm receiving surface 133 according to the first embodiment as an annular flat surface connected integrally to the seal receiving surface 132. Note, however, that the diaphragm receiving surface 133 does not necessarily have to be formed as an annular flat surface connected integrally to the seal receiving surface 132, and may be disposed in the vicinity of the seal receiving surface 132 in the displacement direction of the piston 144. For example, the diaphragm receiving surface 133 may be configured to tilt toward a side (the right side in FIG. 2) approaching the recessed portion surface from the seal receiving surface 132 side to the opening portion 136 side. Conversely, the diaphragm receiving surface 133 may be configured to tilt toward a side (the left side in FIG. 2) separating from the recessed portion surface from the seal receiving surface 132 side to the opening portion 136 side. Further, even if the diaphragm receiving surface 133 and the seal receiving surface 132 does not form a flat surface, as long as they are connected smoothly so as to form, for example, an integrated curved surface, the diaphragm 180 can be caused to deform smoothly.

Figure 8A:
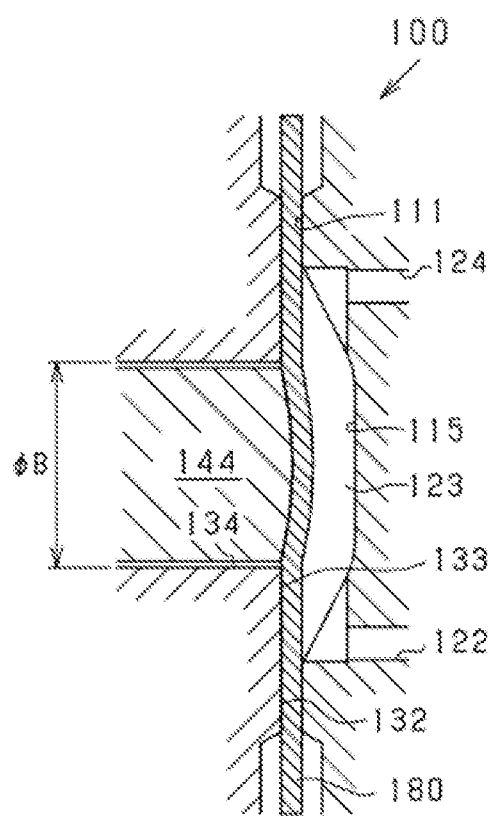
FIGS. 8A, 8B, and 8C are sectional views showing displacement (deformation) conditions of the diaphragm 180 in the liquid feed pump 100 according to the first embodiment.
Figure 8B:
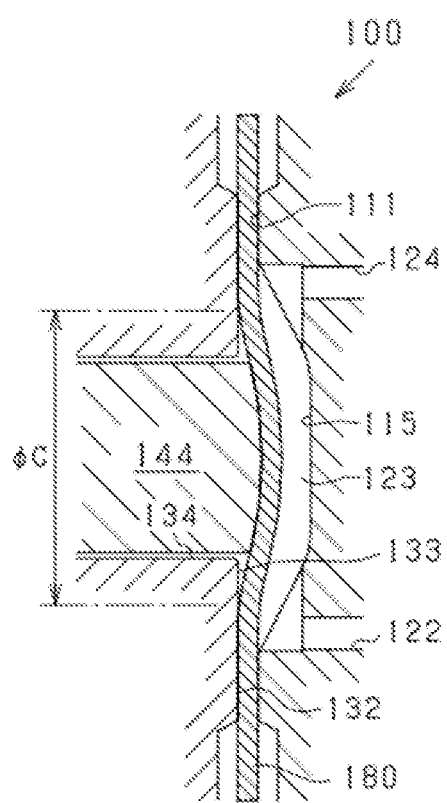
Figure 8C:
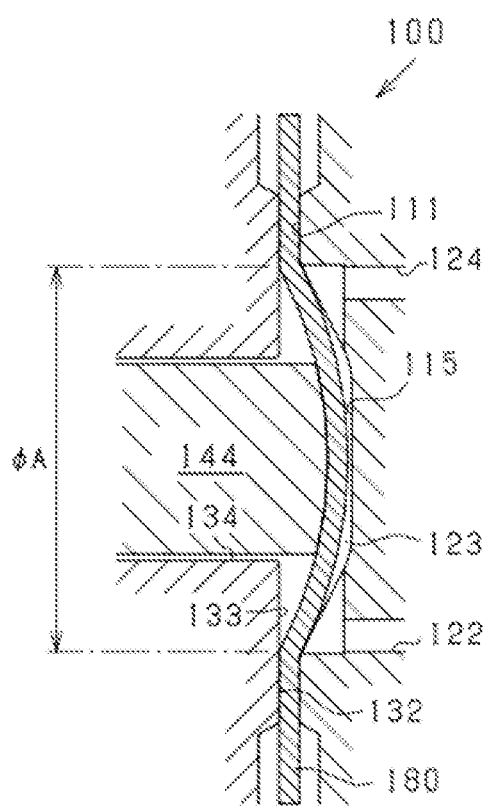

FIGS. 8A, 8B, and 8C are sectional views showing displacement (deformation) conditions of the diaphragm 180 in the liquid feed pump 100 according to the first embodiment. FIG. 8A shows an operating condition at a high pressure, FIG. 8B shows an operating condition at an intermediate pressure, and FIG. 8C shows an operating condition at a low pressure. The operating conditions shown in FIGS. 8A and 8C correspond respectively to the operating conditions shown in FIGS. 5A and 5B.

At a high pressure, the displacement amount (stroke) of the piston 144 is restricted, and therefore a displacement range (also referred to as a deformation range or an operating range) of the diaphragm 180 is limited to the circular range having the diameter φB. The displacement amount of the piston 144 is restricted automatically as an internal pressure of the pump chamber 123 increases, and depending on specifications of the laminated piezoelectric actuator 141, an excessive load may be prevented from acting on the diaphragm 180 by switching a control law to a law used at a high pressure, for example.

At an intermediate pressure, the displacement amount (stroke) of the piston 144 is increased such that the operating range of the diaphragm 180 increases to a circular range having a diameter φC. The operating range of the diaphragm 180 increases as the pressure of the eluent decreases. At a low pressure, the displacement amount (stroke) of the piston 144 is increased further, and to an entire region, or in other words the circular range having the diameter φA.

Hence, with the liquid feed pump 100 according to the first embodiment, the operating range of the diaphragm 180 can be varied automatically in accordance with a discharge pressure of the eluent. More specifically, the operating range of the diaphragm 180 narrows as the internal pressure of the pump chamber 123 rises and widens as the internal pressure of the pump chamber 123 falls.

The liquid feed pump 100 can be controlled by a control system in which a measured value of a discharge flow rate is used as a feedback amount and an operating amount is set as a voltage applied to the laminated piezoelectric actuator 141, for example. In this control system, when the measured value of the discharge flow rate is smaller than a target value, an operation is performed in a direction for increasing the displacement amount of the piston 144, and when the measured value of the discharge flow rate is larger than the target value, an operation is performed in a direction for reducing the displacement amount of the piston 144. Note that a specific configuration of the control system according to this embodiment will be described below.

Hence, with the liquid feed pump 100 according to the first embodiment, the diaphragm 180 can be driven as a diaphragm having an appropriate operating range substantially corresponding to the discharge pressure of the eluent. As a result, the liquid feed pump 100 can be caused to function as a diaphragm pump having a wide dynamic range extending from high pressure/small amount discharge to low pressure/large amount discharge.

Figure 9:
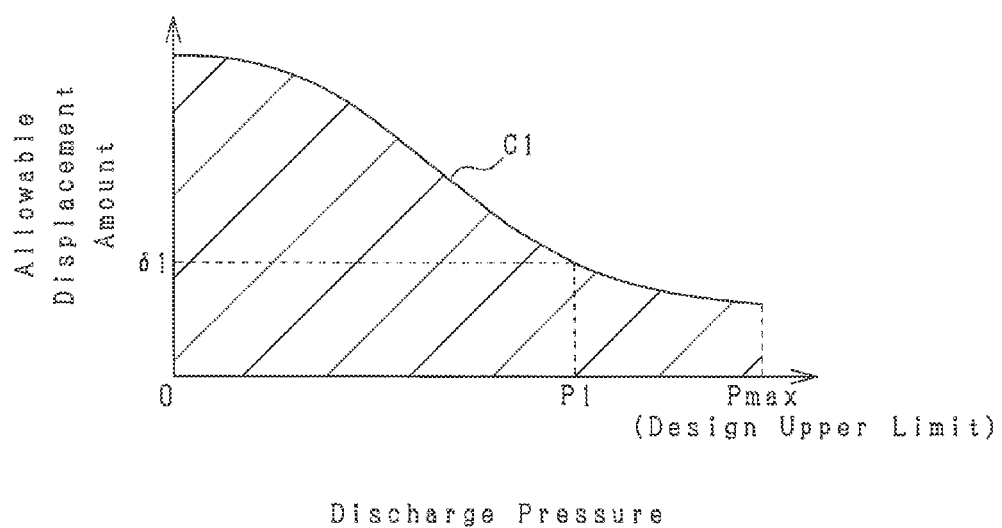
FIG. 9 is a graph showing a relationship between an allowable displacement amount of the piston 144 of the liquid feed pump 100 and a discharge pressure.
Figure 10:
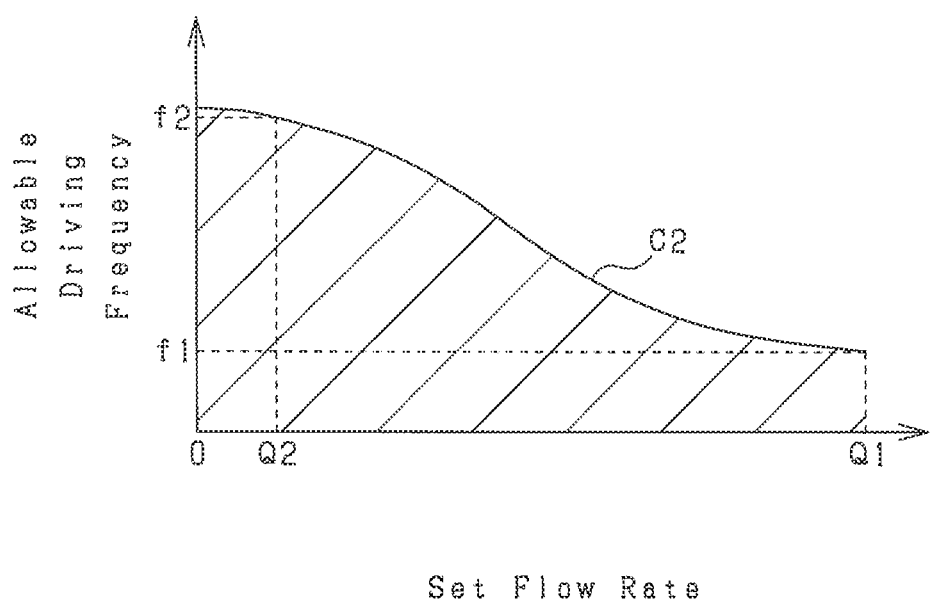
FIG. 10 is a graph showing a relationship between an allowable driving frequency of the piston 144 of the liquid feed pump 100 and a set flow rate.

FIG. 9 is a graph showing a relationship between an allowable displacement amount of the piston 144 of the liquid feed pump 100 and the discharge pressure according to the first embodiment. FIG. 10 is a graph showing a relationship between an allowable driving frequency of the piston 144 of the liquid feed pump 100 and the discharge flow rate (a set flow rate) according to the first embodiment. In FIGS. 9 and 10, curves C1 and C2 show operating restrictions applied to the displacement and the frequency of the piston 144, respectively. More specifically, when the discharge pressure is a pressure P1, for example, the displacement amount of the piston 144 is restricted to a displacement δ1. When the discharge flow rate is a flow rate Q1, meanwhile, the driving frequency of the piston 144 is restricted to a frequency f1. In other words, an operation displacement of the piston 144 is restricted to a range surrounded by the two curves C1 and C2.

The operating restriction relating to the discharge pressure is set on the basis of following knowledge and analysis results obtained by the present inventors. As described above, the liquid feed pump 100 has a favorable characteristic whereby the operating range of the liquid feed pump 100 is varied automatically in accordance with the discharge pressure of the eluent.

However, the present inventors found that, depending on settings of the specifications of the laminated piezoelectric actuator 141 (excessive driving force, for example), the diaphragm 180 may become worn due to excessive displacement of the diaphragm 180 (substantially displacement of the piston 144). More specifically, the present inventors found that when the operating condition of FIG. 8C is established repeatedly by excessive driving force from the laminated piezoelectric actuator 141 at a high pressure, the diaphragm 180 becomes damaged on the periphery of the piston 144.

The operating restriction relating to the discharge flow rate is set on the basis of following experiments and analysis conducted by the present inventors. As described above, the liquid feed pump 100 has a favorable characteristic whereby the displacement amount of the diaphragm 180 is varied automatically in accordance with the discharge pressure of the eluent. In other words, the displacement amount (stroke) of the diaphragm 180 decreases automatically in response to an increase in the discharge pressure of the eluent.

However, the present inventors found that a pulsation effect increases as the discharge flow rate decreases. The reason for this is that when the discharge flow rate decreases, a pulsation rate increases, making pulsation apparent. Further, in high performance liquid chromatography, measurement is performed during the high pressure operation, in which the discharge flow rate is small, and it is therefore desirable to reduce pulsation. On the other hand, the present inventors found that when pump operations (operations of the laminated piezoelectric actuator 141 and the check valves) are reduced by reducing the discharge flow rate, the driving frequency can be increased.

Figure 11A:
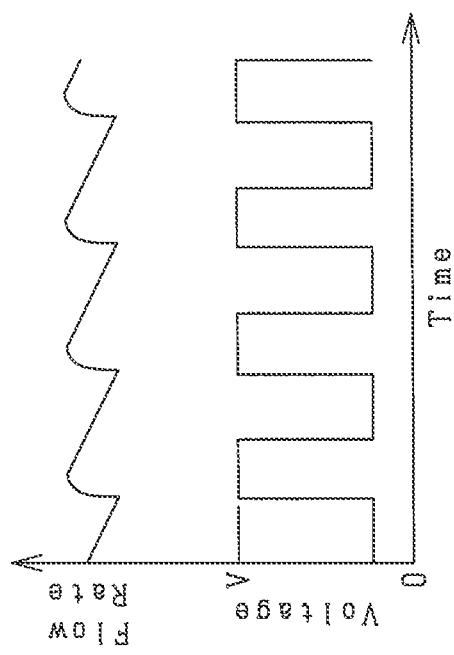

FIGS. 11A, 11B, and 11C are graphs showing the content of driving frequency switching performed on the diaphragm of the liquid feed pump 100 according to the first embodiment. FIGS. 11A, 11B, and 11C show the discharge flow rate (flow rate) and a pulse voltage in a low pressure operation mode and a high pressure operation mode, respectively. In the low pressure operation mode, as shown in FIG. 10, discharge is performed at the comparatively large discharge flow rate Q1 by driving the diaphragm 180 at the comparatively low driving frequency f1.

In the high pressure operation mode, on the other hand, as shown in FIG. 10, discharge is performed at a small discharge flow rate Q2 by driving the diaphragm 180 at a high driving frequency f2. In so doing, flow rate pulsation is reduced greatly in the high pressure operation mode, as can also be seen from a comparison with the comparative examples.

Hence, with the liquid feed pump 100 according to the first embodiment, the driving frequency of the diaphragm 180 can be switched in accordance with the discharge flow rate. In so doing, pulsation can be suppressed by increasing the driving frequency at the small discharge flow rate Q2 while keeping the driving frequency of the diaphragm within the operating range at the large discharge flow rate Q1. The discharge flow rate Q2 of the high pressure operation is the flow rate used during measurement, and it is therefore very important to reduce pulsation.

Note that the driving frequency of the diaphragm does not necessarily have to be adjusted in response to a switch between the low pressure operation mode and the high pressure operation mode, and may be adjusted in response to modification of a set flow rate during the high pressure operation, for example. The set flow rate is a discharge flow rate set by a user in accordance with a measurement subject, a measurement aim, or the like, and serves as a target value in the control system to be described below.

By increasing the driving frequency of the diaphragm 180, the discharge flow rate can be increased while both reducing pulsation and maintaining the stroke of the diaphragm 180, and as a result, a range of the set flow rate of the liquid feed pump 100 during the high pressure operation can be enlarged. In other words, pulsation during measurement can be reduced even further, leading to an improvement in measurement precision, and moreover, the dynamic range of the discharge flow rate of the liquid feed pump 100 during the high pressure operation can be enlarged.

Figure 12:
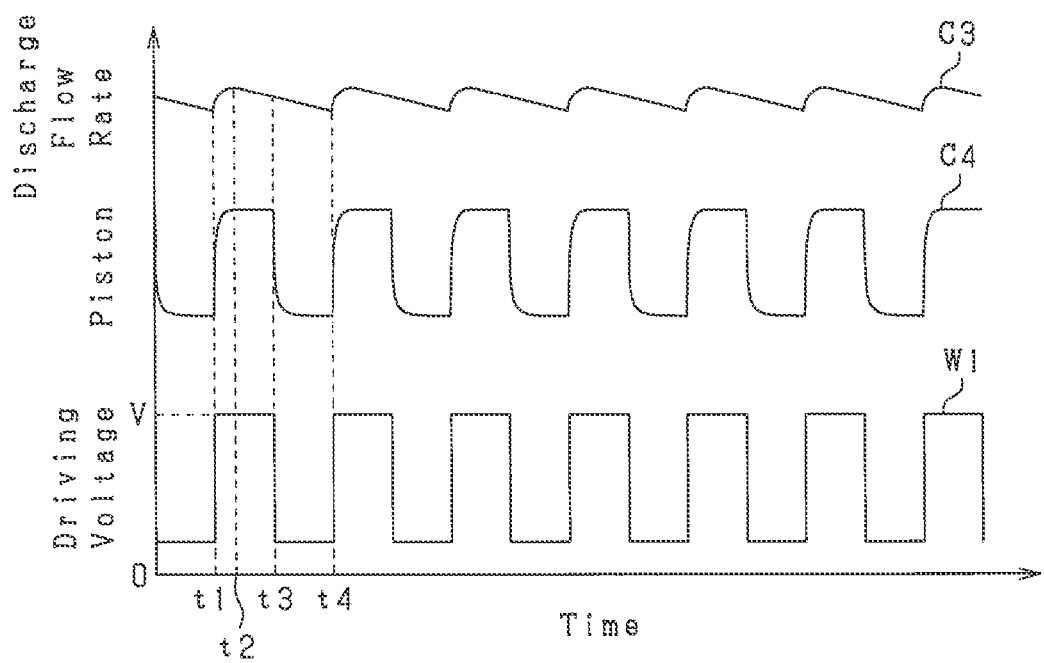
FIG. 12 is a graph showing a driving voltage W1, a discharge flow rate C3, and a piston movement amount C4 of the liquid feed pump 100.

FIG. 12 is a graph showing a driving voltage W1, a discharge flow rate C3, and a piston movement amount C4 of the liquid feed pump 100 according to the first embodiment. The driving voltage W1 is a voltage applied to the laminated piezoelectric actuator 141, and has a rectangular waveform.

At a time t1, the liquid feed pump 100 starts to drive the piston 144 using the laminated piezoelectric actuator 141 in response to the rise of the driving voltage W1. Accordingly, the piston 144 starts to displace the diaphragm 180 such that the volume of the pump chamber 123 begins to decrease, and as a result, the internal pressure of the pump chamber 123 rises. When the internal pressure of the pump chamber 123 exceeds a pressure in the discharge port 125, the check valve 127 opens, whereby chemical discharge begins.

At a time t2, movement of the piston 144 in response to the rise of the driving voltage W1 ends such that the piston 144 stops. Accordingly, the volume of the pump chamber 123 stops varying, and therefore chemical discharge from the pump chamber 123 ceases and the check valve 127 closes.

At a time t3, the liquid feed pump 100 starts to drive the piston 144 in an opposite direction using the laminated piezoelectric actuator 141 in response to the fall of the driving voltage W1. Accordingly, the internal pressure of the pump chamber 123 falls. When the internal pressure of the pump chamber 123 falls below a pressure in the inflow port 121, the check valve 126 opens, whereby chemical inflow begins.

The discharge flow rate C3 is a flow rate supplied to a measurement instrument prepared on the user side, such as an injector or a column. The discharge flow rate C3 is a value measured by the flow rate sensor 50 downstream of a volume damper 80 and an orifice 51, to be described below. Pulsation in the discharge flow rate C3 is reduced by the volume damper 80 and the orifice 51.

The liquid feed pump 100 can reduce pulsation in the discharge flow rate by quickening a pulse frequency of the driving voltage W1. The laminated piezoelectric actuator 141 can be driven at several kHz, for example. Note, however, that when a limit on a responsiveness of the check valves 126 and 127 is lower than the driving frequency of the laminated piezoelectric actuator 141, the driving frequency of the laminated piezoelectric actuator 141 may be set on the basis of the responsiveness of the check valves 126 and 127.

Figure 13:
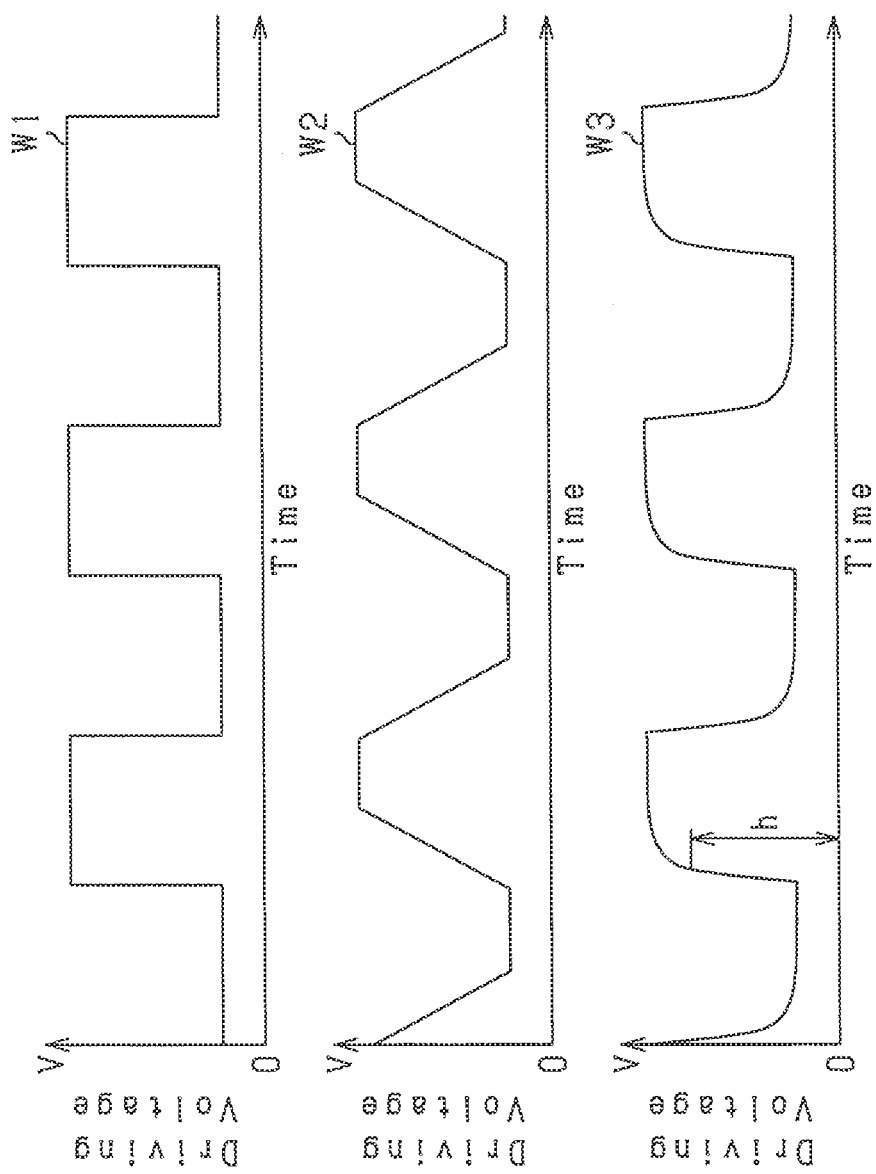
FIGS. 13A, 13B, and 13C are graphs showing pulse shapes of three driving voltages W1, W2, and W3 that can be used to drive the liquid feed pump 100.

FIGS. 13A, 13B, and 13C are graphs showing pulse shapes of three driving voltages W1, W2 and W3 that can be used to drive the liquid feed pump 100. As noted above, the driving voltage W1 has a rectangular waveform and is suitable for driving at a comparatively high frequency. The driving frequency W2 is a ramp wave having an effect for suppressing pulsation in the discharge flow rate, and is suitable for driving at a comparatively low frequency. The driving frequency W3 has a rounded waveform on a rising edge at or above a voltage h, and is therefore capable of reducing pulsation by suppressing a rapid increase in the discharge flow rate at a comparatively high frequency. Note that the driving voltages W1, W2 and W3 will also be referred to as pulse voltages. Further, the voltage h may be set as a voltage at which the diaphragm 180 starts to deform when driven by the laminated piezoelectric actuator 141, for example.

Figure 14:
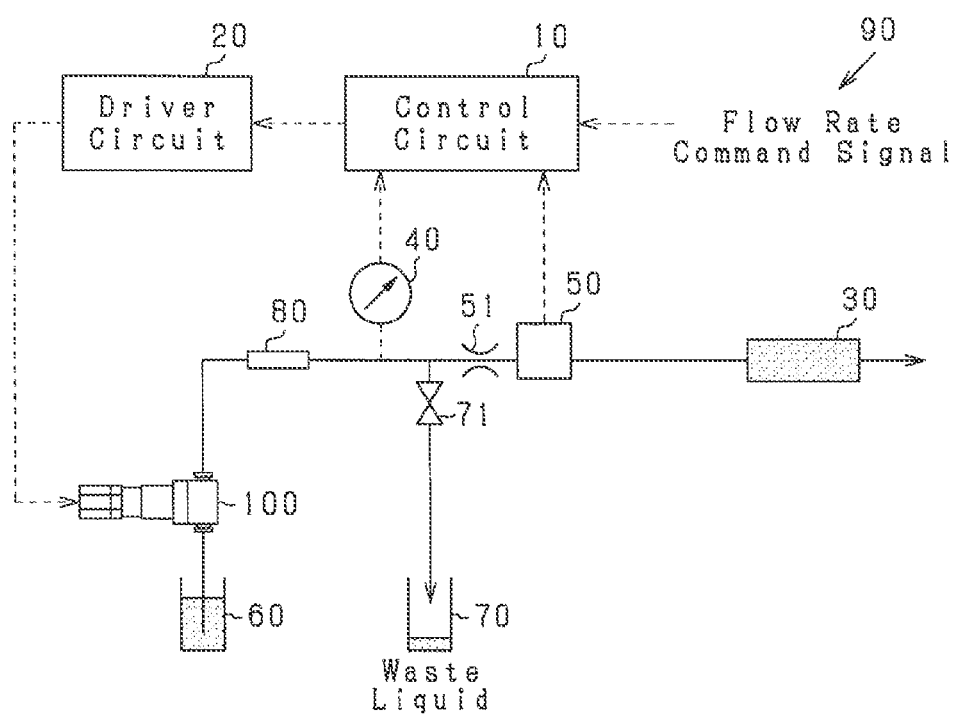
FIG. 14 is a block diagram showing a configuration of a high performance chromatography device 90 according to the first embodiment.

FIG. 14 is a block diagram showing a configuration of a high performance chromatography device 90 according to the first embodiment. The high performance chromatography device 90 includes a solvent storage jar 60 storing the eluent, the liquid feed pump 100, the volume damper 80, a pressure sensor 40, the flow rate sensor 50, the orifice 51, a waste liquid jar 70, a waste liquid valve 71, a load 30, a driver circuit 20 that applies a driving voltage to the liquid feed pump 100, and a control circuit 10. The load 30 includes measurement instruments prepared on the user side, such as an injector, a column, a detector, and a recorder.

The liquid feed pump 100 suctions the eluent from the solvent storage jar 60, and supplies the suctioned eluent to the load 30 via the volume damper 80, the orifice 51, and the flow rate sensor 50, in that order. The volume damper 80 and the orifice 51 serve to reduce pulsation. The flow rate of the eluent supplied to the load 30 is measured by the flow rate sensor 50, and a resulting measurement value is transmitted to the control circuit 10. The pressure sensor 40 measures a pressure of the eluent between the volume damper 80 and the orifice 51. Note that the control circuit 10 and the driver circuit 20 will also be referred to as a control unit. The control unit, the pressure sensor 40, and the flow rate sensor 50 will also be referred to as a control device.

The control circuit 10 adjusts a voltage value of the driving voltage by operating the driver circuit 20 in accordance with a flow rate command signal and the measurement value of the flow rate sensor 50, and performs feedback control for bringing the measurement value of the flow rate sensor 50 close to the flow rate command signal. This feedback control is performed within a range of allowable displacement amounts (allowable driving voltages) and allowable driving frequencies (voltage pulse frequencies) set in advance on the basis of the operating restrictions (see FIGS. 9 and 10).

Figure 15:
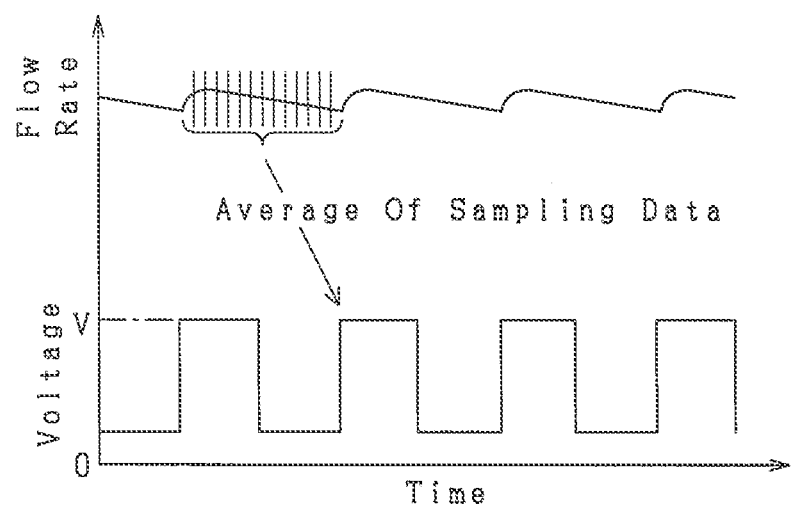
FIG. 15 is an illustrative view showing the content of measurement performed by a flow rate sensor 50 provided in the high performance chromatography device 90, and feedback performed in relation thereto according to the first embodiment.

FIG. 15 is an illustrative view showing the content of the measurement performed by the flow rate sensor 50 and feedback to the measurement in the high performance chromatography device 90 according to the first embodiment. The control circuit 10 performs flow rate control by obtaining an average value per period of a discharge flow rate measured (sampled) by the flow rate sensor 50 at a plurality of measurement timings within respective reciprocation driving periods of the laminated piezoelectric actuator 141, and performing feedback in relation to the discharge flow rate. As a result, measurement errors caused by flow rates that vary periodically during a pump operation (i.e. pulsation) can be suppressed, and accurate feedback control can be realized. Measurement errors caused by pulsation occur due to deviations (phase differences) in the measurement timings within the respective driving periods.

When eluent is to be introduced into the high performance chromatography device 90 or the eluent is to be replaced, liquid is discharged into the waste liquid jar 70 by opening the waste liquid valve 71. At this time, the liquid feed pump 100 is required to perform discharge at a low-pressure, large flow rate.

Second Embodiment

Figure 16:
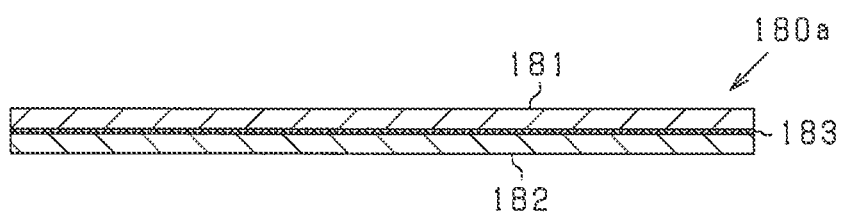
FIG. 16 is a sectional view showing a diaphragm 180a used in a liquid feed pump 100c according to a second embodiment.

FIG. 16 is a sectional view showing a diaphragm 180a used in a liquid feed pump 100c according to a second embodiment. The diaphragm 180a has a three-layer structure including a first metal plate 181 and a second metal plate 182 made of nickel/cobalt alloy, and an elastic adhesion layer 183 serving as an adhesion layer for adhering the first metal plate 181 and the second metal plate 182 to each other. The elastic adhesion layer 183 is a resin layer that possesses elasticity in a direction for displacing the first metal plate 181 and the second metal plate 182 relative to each other in an in-plane direction thereof.

A one-part elastic adhesive having modified silicone resin or epoxy modified silicone resin as a main component or a two-part elastic adhesive constituted by a base resin (epoxy resin) and a hardener (modified silicone resin), for example, may be used to form the elastic adhesion layer 183.

Figure 17A:
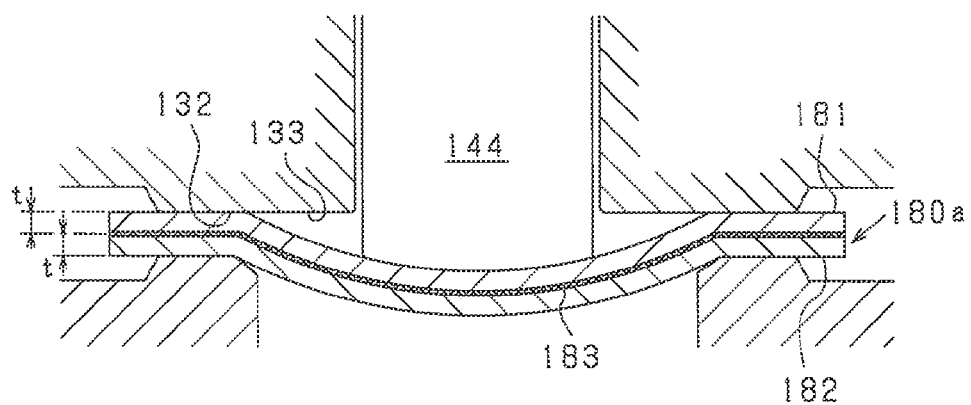
FIGS. 17A and 17B are sectional views comparing operating conditions of the diaphragm 180a according to the second embodiment and a diaphragm 180b according to a comparative example.
Figure 17B:
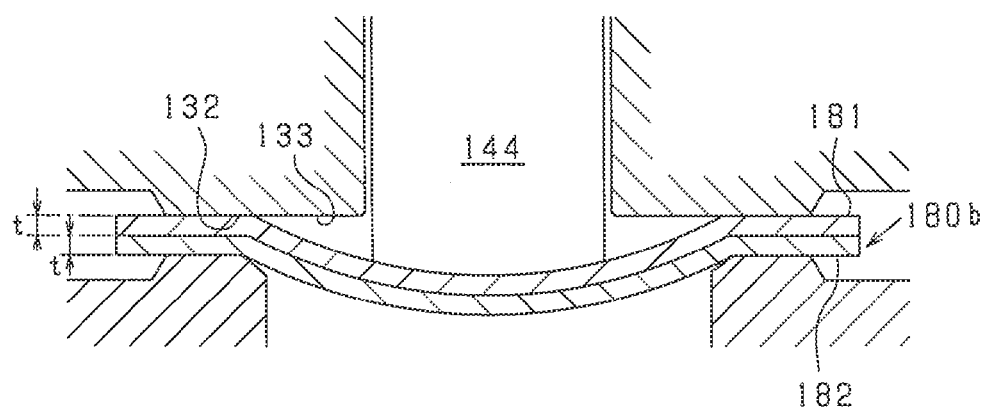

FIGS. 17A and 17B are sectional views comparing operating conditions of the diaphragm 180a according to the second embodiment and a diaphragm 180b according to a comparative example. FIG. 17A shows a condition in which the diaphragm 180a according to the second embodiment is deformed, and FIG. 17B shows a condition in which the diaphragm 180b according to the comparative example is deformed. In the diaphragm 180b according to the comparative example, the first metal plate 181 and the second metal plate 182 are laminated, but an adhesion layer such as that of the second embodiment is not provided.

In the diaphragm 180b according to the comparative example, the laminated first metal plate 181 and second metal plate 182 respectively have a thickness t, and therefore pressure resistance is doubled. The reason for the increase in pressure resistance is that the pressure resistance is dependent on a tensile strength in the in-plane direction (an expansion direction) of the first metal plate 181 and others, and therefore the diaphragm 180a has substantially equal pressure resistance to a metal plate material having twice the thickness on each layer.

Meanwhile, since the first metal plate 181 and the second metal plate 182 are simply laminated together in the diaphragm 180b according to the comparative example, a bending rigidity of them is obtained by adding together the respective bending rigidity values of the first metal plate 181 and the second metal plate 182. In other words, the bending rigidity of the diaphragm 180b according to the comparative example is twice the bending rigidity of the first metal plate 181.

However, since the diaphragm 180b according to the comparative example is not adhered, the diaphragm 180b is dismantled during diaphragm cleaning. Hence, the present inventors found that a lamination condition of the diaphragm 180b varies when the diaphragm 180b is reassembled following cleaning. Moreover, the present inventors found that during assembly of the diaphragm, foreign matter becomes trapped between the first metal plate 181 and the second metal plate 182, causing a durability of them to deteriorate.

The diaphragm 180a according to the second embodiment differs in that the first metal plate 181 and the second metal plate 182 are adhered to each other. Since the pressure resistance is dependent on the tensile strength in the in-plane direction (a lengthwise direction) of the first metal plate 181 and others, the pressure resistance can be doubled regardless of whether or not the layers are adhered.

Meanwhile, in the diaphragm 180a according to this embodiment, the first metal plate 181 and the second metal plate 182 are adhered to each other, and therefore, assuming that deviation and deformation does not occur between the layers, the bending rigidity of the diaphragm 180a is increased eightfold. The reason for this increase is that the first metal plate 181 and the second metal plate 182 behave as a single plate material having twice the thickness.

In the diaphragm 180a, however, the first metal plate 181 and the second metal plate 182 are adhered to each other by the elastic adhesion layer 183 possessing elasticity in a direction for displacing the first metal plate 181 and the second metal plate 182 relative to each other in the in-plane direction of them, and therefore this excessive bending rigidity can be avoided. The reason for this is that since the first metal plate 181 and the second metal plate 182 are adhered to each other by the elastic adhesion layer 183 that possesses elasticity in a direction for displacing the first metal plate 181 and the second metal plate 182 relative to each other in the in-plane direction of them, the bending rigidity of the diaphragm 180a is close to that of the diaphragm 180b according to the comparative example.

By constructing the diaphragm 180a such that the first metal plate 181 and the second metal plate 182 are adhered to each other, the diaphragm need not be dismantled during cleaning and other maintenance. As a result, the diaphragm 180a can be improved in maintainability, and the problem of variation in the lamination condition of the diaphragm 180a during reassembly following maintenance can be solved. Hence, calibration of the diaphragm 180a following dismantling and maintenance such as cleaning can be simplified or eliminated.

Further, during assembly of the diaphragm, the problem of a reduction in durability due to foreign matter becoming trapped between the first metal plate 181 and the second metal plate 182 can be suppressed. Moreover, a maximum distortion of the first metal plate 181 and the second metal plate 182 can be reduced, enabling an improvement in the durability of the diaphragm 180a.

Note, however, that a thickness of the elastic adhesion layer 183 is preferably no greater than 10 μm. The reason for this is that the elastic adhesion layer 183 may be deformed in an out-of-plane direction (a thickness direction) of the diaphragm 180a by the pressure of the pump chamber 123 such that the volume of the pump chamber 123 varies, and as a result, the discharge amount may become unstable.

Figure 18:
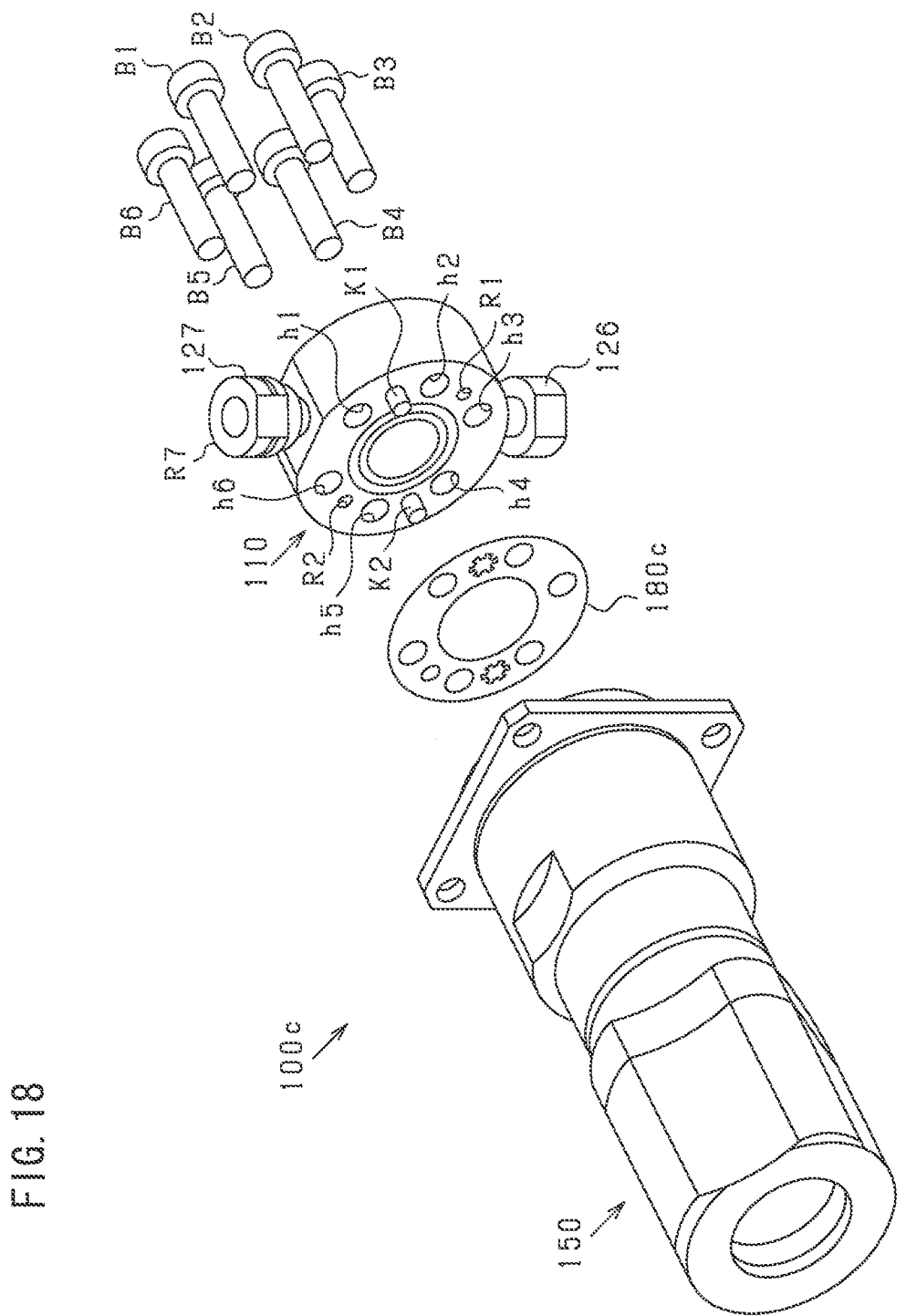
FIG. 18 is an exploded perspective view showing the liquid feed pump 100c according to the second embodiment in an exploded condition.

FIG. 18 is an exploded perspective view showing the liquid feed pump 100c according to the second embodiment in an exploded condition. The liquid feed pump 100c is configured such that the diaphragm 180c is sandwiched between the pump body 110 and the actuator 150. The pump body 110 is fastened to the actuator 150 by inserting six bolts B1 to B6 respectively into through holes h1 to h6 formed in the pump body 110 and screwing the bolts B1 to B6 to the actuator 150.

Figure 19:
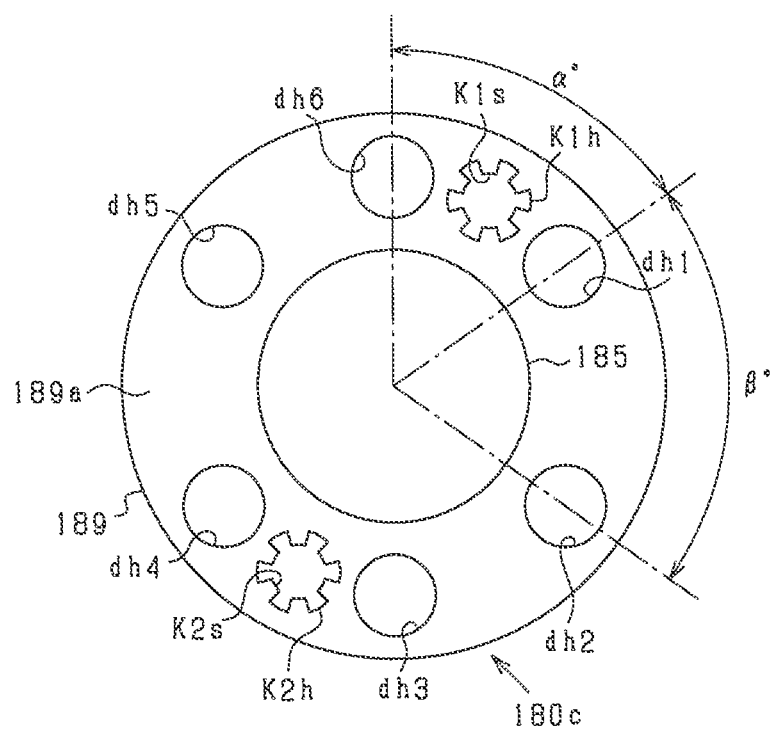
FIG. 19 is a plan view showing an outer appearance of the diaphragm 180c according to another example of the second embodiment.

FIG. 19 is a plan view showing an outer appearance of a diaphragm 180c according to another example of the second embodiment. The diaphragm 180c includes an attachment plate material 189. In the attachment plate material 189, a site that projects further in an outer edge direction than another metallic plate material 185 and others serves as an attachment portion 189a for attaching the diaphragm 180c to the pump body 110. A pair of keyholes K1h and K2h and through holes dh1 to dh6 into which the six bolts B1 to B6 are respectively inserted are formed in the attachment portion 189a. The six bolts B1 to B6 will also be referred to as a fastening member. Note that the pump body 110 and the actuator 150 will also be referred to as a first member and a second member, respectively.

The pair of keyholes K1h and K2h are disposed in opposing positions (positions located on a straight line) relative to a central position of the diaphragm 180c. The pair of keyholes K1h and K2h are disposed thus so that a large distance is secured between the pair of keyholes K1h and K2h, enabling an increase in a positioning precision obtained with the pair of keyholes K1h and K2h. The keyholes K1h and K2h are provided respectively with biasing portions K1s and K2s. The biasing portions K1s and K2s are formed as a plurality of elastic projections provided on an inner edge of the keyholes K1h and K2h. When keys (parts of a fluid instrument) K1 and K2 projecting from the pump body 110 are inserted into the keyholes K1h and K2h, the biasing portions K1s and K2s respectively engage with the keys K1 and K2. As a result, the diaphragm 180c is prevented from falling out of the pump body 110, and assembly is facilitated. In a condition where the biasing portions K1s and K2s are engaged with the keys K1 and K2, the biasing portions K1s and K2s bias the respective keys K1 and K2 such that reaction force generated by the respective engagements is canceled out.

The through holes dh1 to dh6, meanwhile, are disposed in an annular shape at an uneven pitch. More specifically, an angle α between the through hole dh1 and the through hole dh6 is set at a different angle to an angle β between the through hole dh1 and the through hole dh2. As a result, the keys K1 and K2 can be prevented from being attached to the respective keyholes K1h and K2h in reverse. Note, however, that the through holes dh1 to dh6 do not necessarily have to be arranged in an annular shape. In other words, a shape (in this case, a hexagon) formed by linking central positions of the through holes dh1 to dh6 may be any shape that is asymmetrical relative to a line segment in any direction in the plane of the diaphragm 180c. Thus, erroneous attachment of the diaphragm 180c can be suppressed.

Further, detachment holes R1 and R2 are formed in the pump body 110. The detachment holes R1 and R2 are holes for inserting rods (not shown) used to detach the diaphragm 180c from the pump body 110 during dismantling. Thus, the user can detach the diaphragm 180c easily during dismantling by inserting the rods (not shown) into the detachment holes R1 and R2 in the pump body 110 from an opposite side of the diaphragm 180c.

Figure 20:
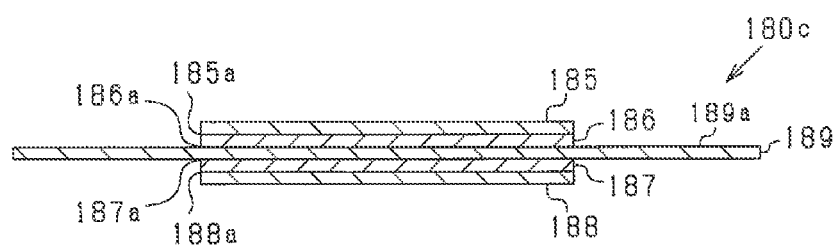
FIG. 20 is a sectional view showing the diaphragm 180c according to the other example of the second embodiment in a laminated condition.
Figure 21:
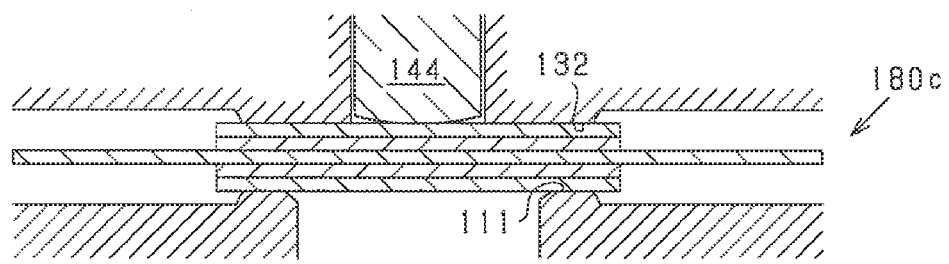
FIG. 21 is a sectional view showing the diaphragm 180c according to the other example of the second embodiment in an attached condition.

FIG. 20 is a sectional view showing the diaphragm 180c according to the other example of the second embodiment in a laminated condition. FIG. 21 is a sectional view showing the diaphragm 180c according to the other example of the second embodiment in an attached condition. The diaphragm 180c is constructed by laminating four metal plates 185 to 188 made of nickel/cobalt alloy, for example, and a single attachment plate material 189 made of stainless steel (SUS304 or SUS316, for example).

More specifically, the metal plates 186 and 187 are adhered to either side of the attachment plate material 189 formed of a stainless steel metal plate via elastic adhesion layers 186a and 187a, whereupon the metal plates 185 and 188 are adhered respectively to the metal plates 186 and 187 via elastic adhesion layers 185a and 188a. Hence, in this embodiment, an equal number of the four nickel/cobalt alloy metal plates 185 to 188 are attached to both surfaces of the stainless steel attachment plate material 189. Note that silicone film of several μm or the like, for example, may be used as the elastic adhesion layers 185a, 186a, 187a and 188a. Further, the metal plate 188 forms a surface opposing the pump chamber 123, and is therefore preferably polished.

Nickel/cobalt alloy exhibits superior elasticity, strength, corrosion resistance, thermal resistance, and constant elasticity. Moreover, nickel/cobalt alloy is non-magnetic and exhibits superior durability. Hence, nickel/cobalt alloy is a suitable material for a metal diaphragm. Stainless steel, meanwhile, is highly workable and exhibits superior corrosion resistance, tenacity, and ductility. In particular, the workability of the stainless steel serving as the material of the attachment plate material 189 facilitates work for forming the keyholes K1h and K2h and the through holes dh1 to dh6.

The attachment plate material 189 is used to reattach the diaphragm 180c following dismantling of the liquid feed pump 100 for cleaning. The four nickel/cobalt alloy metal plates 185 to 188, meanwhile, are members that function as the diaphragm. The four nickel/cobalt alloy metal plates 185 to 188 and the stainless steel attachment plate material 189 are sandwiched between the seal pressurization surface 111 and the seal receiving surface 132.

Hence, with the multi-layer diaphragm according to this embodiment, the number of laminated layers can be set freely in consideration of the pressure resistance and operability of the diaphragm.

The embodiments described in detail above have the following advantages.

(1) According to the above embodiments, a long-life liquid feed pump in which particle generation does not occur can be realized.

(2) According to the above embodiments, a liquid feed pump that feeds liquid at both a high-pressure, very small flow rate and a low-pressure, large flow rate (i.e. that has a wide dynamic range) can be realized.

(3) In the liquid feed pump according to the above embodiments, the diaphragm receiving surface is formed to be coplanar with the seal receiving surface, and therefore the operating range (deformation range) of the diaphragm can be varied smoothly from a high pressure to a low pressure.

(4) In the liquid feed pump according to the above embodiments, the opening portion of the cylinder hole is formed to be concentric with the diaphragm receiving surface, and therefore the piston presses a substantially central portion of the region of the diaphragm surrounded by the seal pressurization surface and the seal receiving surface. Hence, the load from the piston acts on the diaphragm substantially evenly such that a large load can be prevented from acting locally on the diaphragm.

(5) In the liquid feed pump according to the above embodiments, the center of the opening portion of the cylinder hole is aligned with the center of the recessed portion surface in the axial direction of the cylinder hole. When the diaphragm deforms, therefore, the central portion of the pump chamber varies in volume, and as a result, the pressure in the pump chamber varies in a balanced manner such that the eluent can be fed smoothly.

(6) In the control device according to the above embodiments, the displacement amount of the piezoelectric actuator is restricted in accordance with the discharge pressure, and therefore damage to the diaphragm caused by excessive displacement of the piezoelectric actuator at a high pressure can be prevented.

(7) With the multi-layer diaphragm according to the above embodiments, both superior pressure resistance and flexibility can be achieved.

(8) With the multi-layer diaphragm according to the above embodiments, erroneous attachment is suppressed, enabling an improvement in maintainability.

(9) With the multi-layer diaphragm according to the above embodiments, calibration following dismantling and cleaning can be simplified or eliminated.

Other Embodiments

The present invention is not limited to the above embodiments and may be implemented as follows, for example.

Figure 22A:
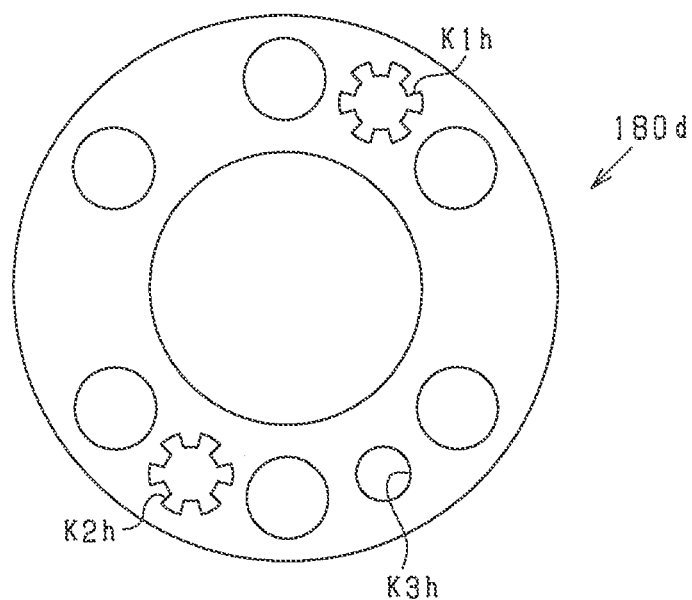
FIGS. 22A and 22B are external views showing a configuration of a diaphragm 180d and a pump body 110a according to a first modified example.
Figure 22B:
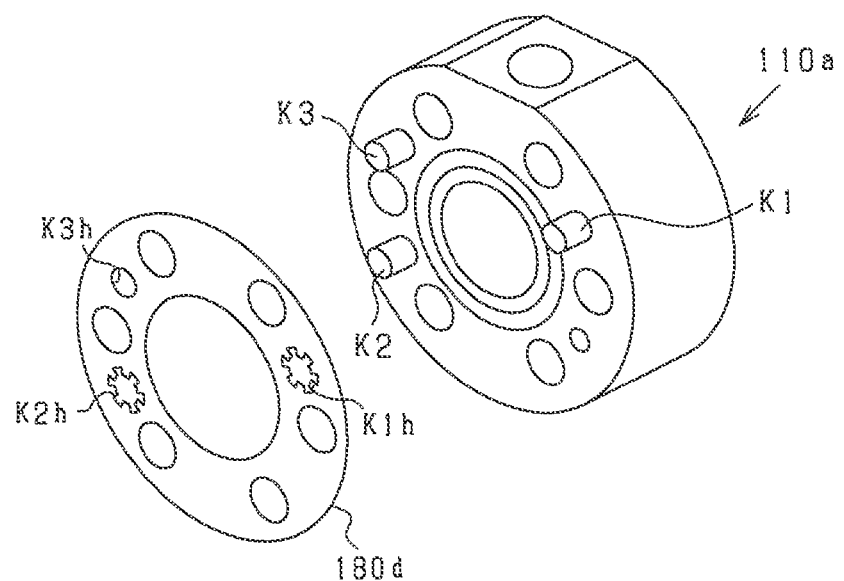

(1) In the above embodiments, the two keyholes K1h and K2h are used for positioning, but for example, three or more keyholes may be provided, as in a diaphragm 180d according to a first modified example. FIGS. 22A and 22B are external views showing a configuration of the diaphragm 180d according to the first modified example and a pump body 110a.

In the diaphragm 180d according to the first modified example, a third keyhole K3h is formed in addition to the keyholes K1h and K2h. In so doing, a situation in which the diaphragm 180d is rotated 180 degrees about a central axis thereof such that the key K1 and the key K2 are inserted into the wrong keyholes K1h and K2h (the opposite keyholes) can be prevented. In other words, a situation in which the key K1 and the key K2 are inserted respectively into the keyhole K2h and the keyhole K1h can be prevented.

Further, the third keyhole K3h is formed in a position deviating from a vertical bisector of a line linking central positions of the keyholes K1h and K2h. In other words, the keyholes K1h, K2h and K3h are arranged in the diaphragm 180d in an annular shape at an uneven pitch. In so doing, a situation in which the keys K1 and K2 are inserted into the keyholes K2h and K1h in reverse after the diaphragm 180d has been reversed and rotated 180 degrees can be prevented.

Hence, by providing the keys and keyholes in the diaphragm 180d according to the first modified example, various types of erroneous attachment possibly occurring when the diaphragm 180d is rotated 180 degrees or reversed and rotated 180 degrees can be prevented. The keys K1, K2 and K3 and keyholes K1h, K2h and K3h will also be referred to as positioning portions. The keys K1, K2 and K3 will be referred to as positioning projecting portions. The keyholes K1h, K2h and K3h will be referred to as positioning holes. Note that the keyholes K1h, K2h and K3h do not necessarily have to be arranged in a ring shape. In other words, a shape (in this case, a triangle) formed by linking the central positions of the keyholes K1h, K2h and K3h may be any shape that is asymmetrical relative to a line segment in any direction in the plane of the diaphragm 180d. Thus, erroneous attachment of the diaphragm 180d can be suppressed.

(2) In the above embodiments, the diaphragm 180c is prevented from becoming detached from the pump body 110 by the biasing portions K1s and K2s attached to the keyholes K1h and K2h. For example, however, biasing portions for preventing detachment may be provided in a location other than the keyholes K1h and K2h, as in a diaphragm 180e according to a second modified example.

Figure 23A:
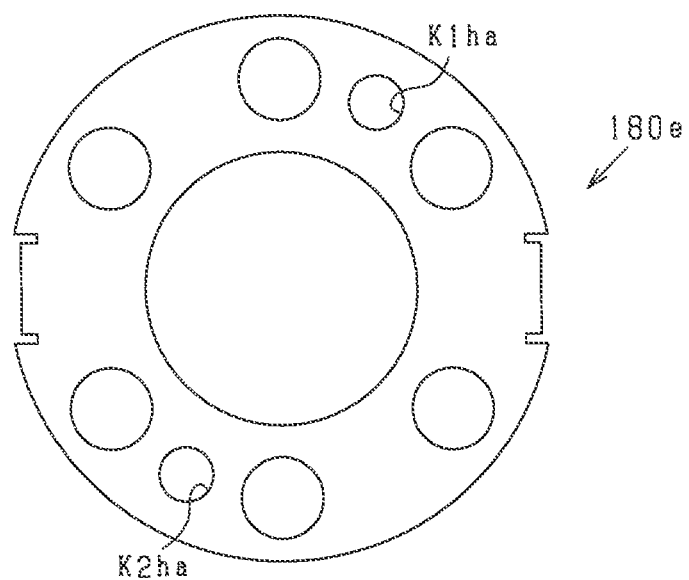
FIGS. 23A and 23B are external views showing a configuration of a diaphragm 180e according to a second modified example.
Figure 23B:
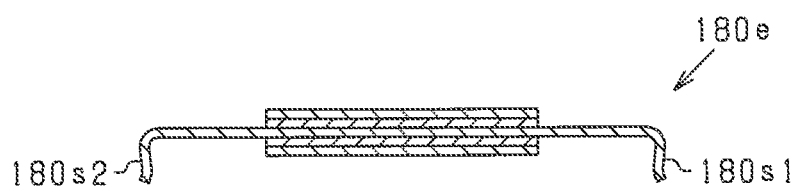

FIGS. 23A and 23B are a plan view and a sectional view, respectively, showing a configuration of the diaphragm 180e according to the second modified example. The diaphragm 180e includes a pair of temporary holding flanges 180s1 and 180s2. The temporary holding flanges 180s1 and 180s2 are capable of generating a biasing force in a direction sandwiching the pump body 110a (a direction for reducing an interval between the two temporary holding flanges 180s1 and 180s2). As a result, the diaphragm 180e is prevented from becoming detached from the pump body 110a, and assembly thereof is facilitated. Hence, the diaphragm 180e may be prevented from becoming detached by biasing a part of the pump body 110 such that reaction force is canceled out.

(3) In the above embodiments, the diaphragm receiving surface is formed to be coplanar with the seal receiving surface, but the diaphragm receiving surface does not necessarily have to be coplanar. When the diaphragm receiving surface is formed to be coplanar, however, the operating range (deformation range) of the diaphragm can be varied smoothly from a high pressure to a low pressure. The diaphragm receiving surface 133 may be configured as desired as long as a contact area of the diaphragm receiving surface 133, which is a surface area of a surface that contacts the diaphragm 180, varies in accordance with the internal pressure of the pump chamber 123.

(4) The seal receiving surface is flat in the above embodiments, but may be curved. When the seal receiving surface is flat, however, excessive damage to the diaphragm caused by a load (a sealing load) exerted on the diaphragm in order to seal the pump chamber can be avoided. As a result, the sealing load can be managed more easily, and therefore torque management of the bolts B1 to B6 on the user side can be facilitated during reattachment of the diaphragm.

(5) The surface of the piston that contacts the diaphragm is a projecting curved surface in the above embodiments, but may be a flat surface. When the contact surface with the diaphragm is a projecting curved surface, however, the diaphragm can be supported by the diaphragm receiving surface on the periphery of the opening portion 136 of the cylinder hole 134 while the region of the diaphragm that contacts the piston is varied by the projecting curved surface. Further, the deformation range of the diaphragm increases in accordance with the displacement amount of the piston, and therefore the discharge amount can be adjusted finely at a high pressure. The projecting curved surface may be formed in a workable spherical surface shape, for example.

(6) The intake port and the discharge port are disposed in opposing positions in the above embodiments, but may be disposed otherwise. When the intake port and the discharge port are disposed in opposing positions, however, the liquid feed pump can be disposed such that the intake port and the discharge port are provided respectively on a lower side and an upper side in a vertical direction, for example, and in so doing, liquid retention can be eliminated, making it easier to replace the liquid and remove air bubbles.

(7) The diaphragm is driven by a piezoelectric actuator in the above embodiments, but may be driven using another driving method. When the diaphragm is driven by a piezoelectric actuator, however, the diaphragm can be driven at a high frequency such that the discharge amount can be secured by a small displacement of the diaphragm, and pulsation can be reduced.

(8) In the above embodiments, the entire diaphragm receiving surface contacts the diaphragm when driving is not underway. However, at least a part of the diaphragm receiving surface may be separated from the diaphragm when the discharge pressure is low, for example, or this condition may be set as a permanent deformation during an operation. The diaphragm receiving surface may be configured as desired as long as the diaphragm is supported thereby when the internal pressure of the pump chamber increases so that the load exerted on the piston is lightened.

When the internal pressure of the pump chamber increases, the diaphragm receiving surface may lighten the load exerted on the piston by bearing a load obtained by multiplying the internal pressure of the pump chamber by a surface area of a contact surface between the diaphragm and the diaphragm receiving surface. Note that the surface area of the contact surface between the diaphragm and the diaphragm receiving surface will also be referred to as a contact area.

(9) In the above embodiments, the diaphragm is not connected to the piston, and the diaphragm is deformed when pressed by the piston. However, the diaphragm may be connected to the piston. Note that when the diaphragm and the piston are connected, the diaphragm and an apex of the piston are preferably connected by a single point (or a sufficiently small region).

(10) In the above embodiments, the multi-layer diaphragm is used in a liquid feed pump, but the multi-layer diaphragm may be used in a flow control valve, for example. The multi-layer diaphragm may be used widely in fluid instruments employing diaphragms.

The invention claimed is:

1. A multi-layer diaphragm configured to be attached to a fluid device having an actuator to apply a driving force to the multi-layer diaphragm, the multi-layer diaphragm comprising:
   a first metallic plate configured to be deformed and displaced in a thickness direction thereof by the driving force applied from a first side thereof;
   a second metallic plate provided on a second side of the first metallic plate opposite to the first side, the second metallic plate being configured to be deformed and displaced in a thickness direction thereof in accordance with deformation and displacement of the first metallic plate;
   an elastic adhesion layer provided between and in contact with the first and second metallic plates so as to adhere the first and second metallic plates, wherein the elastic adhesion layer having elasticity in a direction of an in-plane displacement of the first and second metallic plates relative to each other; and
   a metallic attachment plate, the attachment plate having an attachment portion configured to be attached to the fluid device, the attachment portion projecting outwardly from an outer edge of the first and second metallic plates.

2. The multi-layer diaphragm according to claim 1, wherein the first and second metallic plates are adhered respectively to either side of the attachment plate.

3. The multi-layer diaphragm according to claim 2, wherein an equal number of the first and second metallic plates are attached to each side of the attachment plate.

4. The multi-layer diaphragm according to claim 1, wherein the attachment portion includes a positioning portion that regulates a positional relationship between the fluid device and the multi-layer diaphragm.

5. The multi-layer diaphragm according to claim 4, wherein the positioning portion includes a biasing portion that biases a part of the fluid device such that a reaction force is canceled out.

6. The multi-layer diaphragm according to claim 5, wherein the fluid device includes a positioning projecting portion, wherein
   the positioning portion includes a plurality of positioning holes into which the positioning projecting portion is inserted, and
   the biasing portion is formed as a plurality of elastic projections provided on an inner edge of at least one of the plurality of positioning holes.

7. The multi-layer diaphragm according to claim 6, wherein the plurality of positioning holes are formed in positions that are asymmetric when the multi-layer diaphragm is halved in any direction in a plane of the multi-layer diaphragm.

8. The multi-layer diaphragm according to claim 7, wherein the plurality of positioning holes are arranged in the attachment portion in an annular shape at an uneven pitch.

9. The multi-layer diaphragm according to claim 6, wherein the fluid device further comprises a first member and a second member sandwiching the multi-layer diaphragm therebetween, and a fastening member fastening the first member to the second member,
   wherein the attachment portion includes a plurality of through holes into which the fastening member is inserted, and
   wherein combinations of the plurality of through holes and the plurality of positioning holes are formed in positions that are asymmetric when the multi-layer diaphragm is halved in any direction in the plane of the multi-layer diaphragm.

10. The multi-layer diaphragm according to claim 6, wherein the fluid device further comprises a first member and a second member sandwiching the multi-layer diaphragm therebetween, and a fastening member fastening the first member to the second member,
   wherein the attachment portion includes a plurality of through holes into which the fastening member is inserted, and
   wherein the plurality of through holes are formed in positions that are asymmetric when the multi-layer diaphragm is halved in any direction in the plane of the multi-layer diaphragm.

11. The multi-layer diaphragm according to claim 10, wherein the plurality of through holes are arranged in the attachment portion in an annular shape at an uneven pitch.

12. The multi-layer diaphragm according to claim 1, wherein the fluid device is a liquid feed pump.

* * * * *